United States Patent
Lee et al.

(10) Patent No.: US 11,165,496 B2
(45) Date of Patent: Nov. 2, 2021

(54) CONTROL AND MANAGEMENT FOR IMPAIRMENT-AWARE OPTICAL NETWORK

(71) Applicant: Huawei Technologies Co., Ltd., Shenzhen (CN)

(72) Inventors: Young Lee, Plano, TX (US); Italo Busi, Segrate (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/016,636

(22) Filed: Sep. 10, 2020

(65) Prior Publication Data
US 2021/0050915 A1 Feb. 18, 2021

Related U.S. Application Data

(63) Continuation of application No. PCT/US2019/046256, filed on Aug. 13, 2019.

(51) Int. Cl.
| | |
|---|---|
| *H04B 10/077* | (2013.01) |
| *H04L 12/24* | (2006.01) |
| *H04L 12/26* | (2006.01) |
| *H04L 12/707* | (2013.01) |
| *H04L 12/703* | (2013.01) |
| *H04L 12/723* | (2013.01) |

(52) U.S. Cl.
CPC ..... *H04B 10/0771* (2013.01); *H04L 41/0668* (2013.01); *H04L 41/0677* (2013.01); *H04L 41/0686* (2013.01); *H04L 43/0823* (2013.01); *H04L 43/50* (2013.01); *H04L 45/22* (2013.01); *H04L 45/28* (2013.01); *H04L 45/50* (2013.01)

(58) Field of Classification Search
CPC ........... H04B 10/0771; H04L 41/0668; H04L 41/0677; H04L 41/0686; H04L 43/0823; H04L 43/50; H04L 45/22; H04L 45/28; H04L 45/50; H04L 43/0811; H04L 45/62; H04L 41/0654; H04L 45/42
USPC .......................................................... 398/16
See application file for complete search history.

(56) References Cited

U.S. PATENT DOCUMENTS

| | | | | |
|---|---|---|---|---|
| 4,399,531 A | * | 8/1983 | Grande | H04L 45/00 370/216 |
| 7,924,728 B2 | * | 4/2011 | Riga | G01D 21/00 370/238 |
| 9,077,760 B2 | * | 7/2015 | McKeown | H04L 29/06 |
| 9,369,785 B1 | | 6/2016 | Schmidtke et al. | |

(Continued)

*Primary Examiner* — Abbas H Alagheband
(74) *Attorney, Agent, or Firm* — Conley Rose, P.C.

(57) ABSTRACT

A network analytics engine predicts impairment of one or more communications links included in a current data path being used to transmit data through a network, and transmits information indicating the predicted impairment to a network controller in a warning message. In response to receiving the warning message, the network controller identifies potential alternative data paths that exclude any communication links predicted to experience an impairment. Before setting up an alternative data path, however, the network controller waits for a fault notification confirming the predicted impairment. If the fault notification is received before expiration of a waiting period, the network controller sets up one of the potential alternative data paths in place of the current data path.

17 Claims, 13 Drawing Sheets

(56) References Cited

U.S. PATENT DOCUMENTS

| | | | |
|---|---|---|---|
| 10,181,919 B2 * | 1/2019 | Zhang | H04J 3/0641 |
| 10,757,020 B2 * | 8/2020 | Morris | H04L 45/50 |
| 2005/0025058 A1 * | 2/2005 | Chaudhuri | H04L 45/123 |
| | | | 370/238 |
| 2006/0111967 A1 * | 5/2006 | Forbes | G06Q 30/0267 |
| | | | 705/14.26 |
| 2008/0049787 A1 * | 2/2008 | McNaughton | H04L 12/66 |
| | | | 370/468 |
| 2011/0126041 A1 | 5/2011 | Matsubara | |
| 2013/0135993 A1 * | 5/2013 | Morrill | H04L 47/122 |
| | | | 370/228 |
| 2013/0301460 A1 * | 11/2013 | Bugenhagen | H04L 29/06326 |
| | | | 370/252 |
| 2015/0195192 A1 | 7/2015 | Vasseur et al. | |
| 2015/0280975 A1 * | 10/2015 | Bamba | H04L 45/22 |
| | | | 370/218 |
| 2016/0285750 A1 * | 9/2016 | Saquib | H04L 43/026 |
| 2021/0050915 A1 * | 2/2021 | Lee | H04L 41/0677 |

* cited by examiner

CONTROL AND MANAGEMENT FOR IMPAIRMENT-AWARE OPTICAL NETWORK

CROSS-REFERENCE TO RELATED APPLICATIONS

This application is a continuation of International Application No. PCT/US2019/046256 filed on Aug. 13, 2019, by Futurewei Technologies, Inc., and titled "Control And Management For Impairment-Aware Optical Network," which is hereby incorporated by reference.

TECHNICAL FIELD

This disclosure relates generally to impairment-aware networks, and more specifically to controlling and managing impairment-aware optical networks.

BACKGROUND

There are various techniques currently used to route the data through a network. For example, circuit switched networks establish a dedicated communications channel (circuit) between two network nodes before the nodes communicate. Pre-establishing the circuit guarantees use of the full bandwidth of the channel, and the circuit remains connected for the duration of the communication session.

Packet-switched networks, in contrast to circuit switched networks, divide data to be transmitted into packets transmitted through the network independently. In a packet switched network links are shared by packets from multiple competing communication sessions. In some packet switched networks, address information is included as part of the data packets, and each node makes its own decision about how to route a data packet based on that address information.

Multiprotocol Label Switching (MPLS) protocols, including Multiprotocol Label Switching Traffic Engineering (MPLS-TE) and Generalized MPLS (GMPLS) protocols use labels to route packets through a network along predefined paths referred to as Label Switched Paths (LSPs). In networks employing LSPs, packets are transmitted from one network node to the next in accordance with the labels, rather than requiring each network node to make its own routing decision based on an endpoint address. MPLS protocols can be implemented in networks employing a Path Computation Element (PCE) based architecture.

In networks employing a PCE based architecture, Path Computation Elements (PCEs) compute the Label Switched Paths (LSPs) at the request of Path Computation Clients (PCCs). In these types of networks, rather than basing routing decisions on address information included in a packet being transmitted through the network, data is routed through the network along the LSPs determined by the PCEs.

Various optical networks, including networks implementing Wavelength Division Multiplexing (WDM), employ a PCE based architecture. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. Two types of WDM networks, Wavelength Switched Optical Networks (WSONs) and Spectrum Switched Optical Networks (SSONs), seek to switch the optical signals with fewer optical-electrical-optical (OEO) conversions along the lightpath. WSON networks are commonly implemented using a fixed-grid type network that use fixed bandwidth channels, while SSONs use a flex-grid type network that allows mixed bit rate transmission systems to allocate their channels with different spectral bandwidths.

Unlike traditional circuit-switched and connection-oriented packet-switched networks, which merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths.

Path computations can also be constrained due to other issues, such as excessive optical noise, along the lightpath. For example, as an optical signal progresses through the network, the signal may be altered by the various physical processes in the optical fibers and devices included in the lightpath. These alterations can cause signal degradation or loss, which are referred to herein as "impairments," or "link impairments."

SUMMARY

Given the constraints imposed on determining routes through a WSON or SSON networks, dynamically controlling the network elements to route packets to avoid link impairments can be difficult. Such control usually depends on an off-line management system, but existing systems lack coordination across or between device-level control, network-wide control, and analysis components. Various embodiments discussed herein provide such coordination through implementation of a seamless control feedback loop. Also disclosed are mechanisms to collect network impairment data from optical networks based on a traceable impairment data definition. In some such embodiments, time-based (time-series) and feedback-loop enabled protocol mechanisms are used to support artificial intelligence (AI)-analytic management engine for impairment validation and signal quality degradation.

Additionally, in various embodiments disclosed herein local fault control and management is coupled with performance monitoring, so that the network can quickly respond to performance degradation before a fault is taking place. Such embodiments integrate local fault management and network-wide performance monitoring, which can enhance the effectiveness of optical impairment control and management for timely response to network problems. For example, by using an analytic engine to provide warnings of impending link impairments, a Path Computation Element (PCE) can proactively select potential alternative paths, and be ready to exert control over the network elements to reroute data in the event a predicted impairment materializes.

Furthermore, various embodiments define impairment data in a way that makes the impairment data traceable at various levels. For example, in various embodiments, rather than defining impairment data only at a fiber level, impairment data is defined by link type, and reported at a link level by sending link status updates from network nodes to a controller. These link status updates can be used to report the status of links "local" to the reporting device.

Various embodiments can use some or all of the techniques and devices described herein to enhance operational effectiveness of optical impairment control and management by integrating otherwise un-coordinated device-level and network-level control modules into a unified system architecture. Additionally, impairment data from two link levels, Optical Transmission Section (OTS) and Optical Multiplexing Section (OMS), can be, applied to diagnose optical signal quality degradation. Furthermore, by recording all, or substantially all, relevant events, including both link impairment predictions, and link impairments—both degradations and faults—future link impairments can be more accurately predicted.

As used herein the term "local link" is used to refer to a link adjacent to a device, and coupled to an input or output of that device for receiving or transmitting data. For example, if a particular link couples a first device on one end of a link to a second device on the other end of that same link, that particular link is considered to be a "local link" of either or both the first and second devices. Links can be defined at the channel level, at the fiber level, or otherwise.

In various embodiments, a network controller includes a processor and associated memory, and a network interface coupled to the processor and associated memory. The network interface is configured to receive a warning message from a network analytics engine, where the warning message indicates a predicted impairment of one or more suspect communication links included in a current data path used to transmit data through a network. In various embodiments, the warning message from the network analytics engine includes information specifying a waiting period.

The processor and associated memory are configured to identify, in response to the warning message, one or more potential alternative data paths to be used to transmit the data through the network. The potential alternative data paths exclude the one or more suspect communication links. The processor and associated memory determine whether a fault notification confirming the predicted impairment of the one or more suspect communications link is received from a device associated with the one or more suspect communication links before expiration of the waiting period. In response to determining that the fault notification is received before expiration of the waiting period, the processor and associated memory set up a particular data path, selected from among the one or more potential alternative data paths, to be used to transmit the data through the network in place of the current data path. In response to determining that the fault notification is not received before expiration of the waiting period, the current data path is left unchanged.

In various embodiments, the processor and associated memory set up the particular data path by transmitting routing information to one or more nodes included in the particular data path. The routing information can include information indicating particular communication links to be used by the one or more nodes.

In some embodiments, the processor and associated memory are further configured to set up the current data path by: 1) determining first nodes included in one or more potential current data paths, the first nodes coupled to each other via first communications links; 2) requesting an impairment validation from the network analytics engine, the impairment validation indicating whether the first communication links are expected to remain impairment free; 3) receiving the impairment validation from the analytics engine; 4) selecting the current data path from among the one or more potential current data paths based on the impairment validation; and 5) transmitting routing information to at least a subset of the first nodes included in the current data path, the routing information including information indicating current first communication links to be used.

The claimed network controller can transmit, to the network analytics engine, a report including information indicating an action taken by the network controller in response to the warning message.

In some embodiments, the network controller is part of a network that includes a Wavelength Switched Optical Network (WSON) or Spectrum Switched Optical Network (SSON), and data paths are set up by transmitting control signals to at least one of a Reconfigurable Optical Add Drop Multiplexer (ROADM) associated with an Optical Multiplexing Section (OMS) link, or an optical In-Line Amplifier (ILA) associated with an Optical Transmission Section (OTS) link. Although the examples set forth herein are presented in the context of WSON networks, the same or similar techniques can be applied to SSON networks, and any examples explained using WSON networks should be understood to apply to both fixed-grid and flex-grid networks. In some such networks, the network controller transmits to one or more network nodes a path computation (PC) update, which includes information specifying one or more data types to which the network controller is subscribing. The network nodes can use that information to generate signal quality reports including data types to which the network controller subscribed. The network controller receives the signal quality reports, and forwards information included in those signal quality reports to the analytics engine. Various implementations include a method for use in the above described network controller, and an optical communications network that includes reconfigurable optical add drop multiplexers (ROADMs) coupled to each other via optical communication links, and a Software Defined Networking (SDN) controller coupled to the ROADMs via other communication links. The SDN controller is configured to establish data paths through the optical communications network by controlling network routing and wavelength assignments (RWAs) for the ROADMs.

In various embodiments, the SDN controller is further configured to: 1) receive a warning message from an optical network analytics engine, the warning message including information identifying predicted impairment of one or more of the optical communications links included in a current data path; 2) identify, in response to the warning message, one or more potential alternative data paths to be used to transmit the data through the network, the one or more potential alternative data paths excluding the one or more suspect communication links; 3) determine whether a fault notification is received from a device associated with the one or more suspect communication links before expiration of a waiting period, the fault notification confirming the predicted impairment of the one or more suspect communications link; and 4) in response to receiving the fault notification before expiration of the waiting period, set up a particular data path to be used to transmit the data through the network in place of the current data path, wherein the particular data path is selected from among the one or more potential alternative data paths.

In some implementations, the SDN controller sets up the particular data path by transmitting routing information to one or more ROADMs, the routing information including information indicating particular communication links to be used by the one or more ROADMs. In some embodiments, the SDN controller is further configured to set up the particular data path by transmitting control signals to at least one of a Reconfigurable Optical Add Drop Multiplexer (ROADM) associated with an Optical Multiplexing Section (OMS) link, or an optical In-Line Amplifier (ILA) associated with an Optical Transmission Section (OTS) link.

The SDN controller can set up the current data path by: 1) determining first ROADMs is included in one or more potential current data paths, the first ROADMs is coupled to each other via first optical communications links; 2) requesting an impairment validation from the optical network analytics engine, the impairment validation indicating whether the first optical communication links are expected to remain impairment free; 3) receiving the impairment validation from the optical network analytics engine; 4) selecting the current data path from among the one or more potential current data paths based on the impairment validation; and 5) transmitting routing information to a subset of the first ROADMs included in the current data path, the routing information including information indicating current first communication links to be used by the subset of first ROADMs.

In various implementations, the SDN controller can also report, to the optical network analytics engine, information indicating an action taken by the SDN controller in response to the warning message. In some embodiments, the SDN controller is further configured to set up the particular data path by transmitting control signals to at least one of a Reconfigurable Optical Add Drop Multiplexer (ROADM) associated with an Optical Multiplexing Section (OMS) link, or an optical In-Line Amplifier (ILA) associated with an Optical Transmission Section (OTS) link.

The SDN controller can be further configured to transmit a path computation (PC) update to one or more ROADMs, the PC update including information specifying one or more data types to which the SDN controller is subscribing, receive signal quality reports from the one or more ROADMs, the signal quality reports including data types to which the SDN controller subscribed, and forward information included in the signal quality reports to the optical network analytics engine.

In some implementations, the optical communications network also includes: an optical network analytics engine that receives data associated with the link states from the SDN controller, maintains historical link-state data associated with the one or more optical links, predicts potentially impaired optical links of the one or more optical links based on the historical link-state data, and transmit prediction information associated with the potentially impaired optical links to the SDN controller.

In some such embodiments, the SDN controller transmits an impairment validation request to the optical network analytics engine, requesting the analytics engine to perform an impairment validation on one or more potential paths through the optical communications network. The optical network analytics engine can reply to the SDN controller with an impairment validation message, which includes information indicating potentially impaired optical links included in the one or more potential paths.

In addition to performing the validation request, the optical network analytics engine can transmit, to the SDN controller, a warning indicating that a potentially impaired optical link has been predicted, where the warning is not associated with a request from the SDN controller. In some such embodiments, the SDN controller responds to receipt of the warning by: 1) determining alternative paths through the optical communications network based on the warning; 2) receiving a fault notification from a device associated with the potentially impaired optical link; 3) designating one of the alternative paths through the optical communications network as a selected alternative path; and 4) setting up the selected alternative path in response to receiving the fault notification.

In various implementations, if the SDN controller flushes alternative paths from memory in response to determining that a fault notification has not been received during a specified waiting period. The SDN controller can report, to the optical network analytics engine, whether the warning sent by the optical network analytics engine corresponds to a received fault notification.

In various embodiments, a potentially impaired optical can include an Optical Transmission Section (OTS) link or an Optical Multiplexing Section (OMS) link.

In some implementations, SDN controller transmits, to one or more ROADMs, a path computation (PC) update, which includes information specifying one or more data types to which the SDN controller is subscribing. The ROADMs can transmit a signal quality report to the SDN controller, where the signal quality report including data types to which the SDN controller subscribed. The SDN controller can forward information included in the signal quality report to the optical network analytics engine, which stores at least a portion of the information included in the signal quality report for use in predicting potentially impaired optical links. When a potentially impaired optical link is identified, the optical network analytics engine can transmit a performance warning to the SDN controller.

ROADM and/or in-line amplifiers (ILAs) can, in some embodiments, transmit a fault notification to the SDN controller in response to the ROADMs identifying a fault associated with the one or more optical links. The performance warning can include a wait time indicating a duration during which the SDN controller is to wait to receive a fault notification before rerouting data in response to the performance warning.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
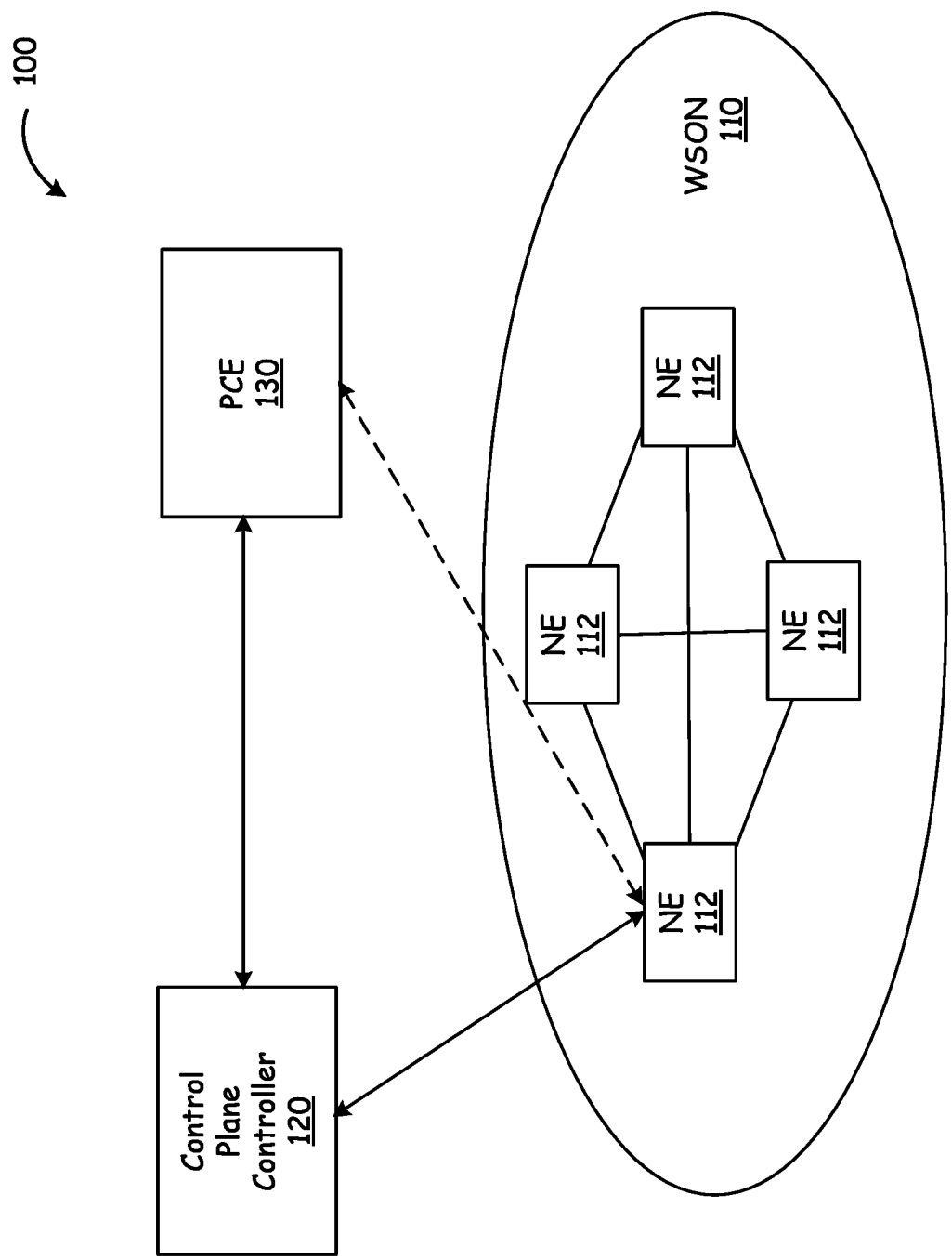
FIG. 1 is a diagram of a system including a Wavelength Switched Optical Network (WSON), according to various embodiments of the present disclosure.

FIG. 1 illustrates a system 100 including a Wavelength Switched Optical Network (WSON), according to various embodiments of the present disclosure. System 100 includes WSON 110, control plane controller 120, and Path Computation Element (PCE) 130, which can communicate with each other via optical, electrical, or wireless channels. WSON 110 also includes multiple Network Elements (NEs) 112 connected via optical fibers. Optical signals are transported through WSON 110 over lightpaths, which pass through some of the NEs 112. In addition, some of the NEs 112, for example those at the ends of WSON 110, may be configured to convert between electrical signals from external sources (not illustrated) and the optical signals used by the WSON 110. Although four NEs 112 are shown in WSON 110, various embodiments can include any number of NEs 112.

As used herein, the term "lightpath" is used interchangeably with the term "datapath," because the lightpath through a WSON/SSON is, in fact, the datapath. Non-optical networks, by definition, do not include lightpaths. However, the examples presented herein are primarily optical networks, so the term lightpath is frequently used. It will be understood that when applying the teachings set forth herein to non-optical networks, and absent any special characteristics of optical networks, that term "lightpath" can be interchanged with the term "data path."

WSON 110 may implement WDM to transport optical signals using various types of optical components, including active components, passive components, or a combination of active and passive components. For example, WSON 110 may comprise optical cross connects (OXC) (not illustrated), photonic cross connects (PXC) (not illustrated), reconfigurable optical add/drop multiplexers (ROADM) (see FIG. 3), wavelength selective switches (WSS) (not illustrated), fixed optical add/drop multiplexers (FOADJVI) (not illustrated), and so forth. WSON 110 may be part of a long haul network, a metropolitan network, an access network, or any other type of network using optical signals to transfer data from one point to another.

Control plane controller 120 may coordinate activities within the WSON 110. Specifically, the control plane controller 120 may receive optical connection requests and provide lightpath signaling to the WSON 110 via Multiprotocol Label Switching Traffic Engineering (MPLS-TE) or Generalized Multi-Protocol Label Switching (GMPLS), thereby coordinating and controlling NEs 112 to route data signals through WSON 110. In addition, control plane controller 120 can communicate with Path Computation Element (PCE) 130 using a PCE communication Protocol (PCEP) to provide PCE 130 with information that may be used for the path computation, and/or receive the path computation from PCE 130, and forward the path computation to the network elements (NEs) 112. The control plane controller 120 may be located in a component outside of the WSON 110, such as an external server, or may be located in a component within the WSON 110, such as a NE 112. In some embodiments, control plane controller 120 is a particular embodiment of PCE 130.

The PCE 130 may perform all or part of the path computation for WSON system 100. Specifically, PCE 130 may determine the routes of Label Switched Paths (LSPs) through WSON 110. As such, PCE 130 may receive path computation constraints to be used for the path computation from the control plane controller 120, from NEs 112, or both. The PCE 130 may use the path computation constraints when computing the routes, e.g., lightpaths, for the optical signals. The path computation may include at least one route for each incoming signal and optionally at least one wavelength associated with each route. The PCE 130 may then send the path computation to the control plane controller 120 or directly to the NEs 112. To assist PCE 130 in this process, PCE 130 may comprise a global traffic-engineering database (TED), a path computation information database, an optical performance monitor (OPM), a physical layer constraint (PLC) information database, or combinations thereof PCE 130 may be located in a component outside of the WSON 110, such as an external server, or may be located in a component within the WSON 110, such as NE 112.

NEs 112 may be coupled to each other via optical fibers. The optical fibers may be used to establish optical links and transport the optical signals between NEs 112. The optical fibers may comprise standard single mode fibers (SMFs) as defined in ITU-T standard G.652, dispersion shifted SMFs as defined in ITU-T standard G.653, Sep. 18, 2008, cut-off shifted SMFs as defined in ITU-T standard G.654, non-zero dispersion shifted SMFs as defined in ITU-T standard G.655, wideband non-zero dispersion shifted SIFs as defined in ITU-T standard G.656, or combinations thereof. These fiber types may be differentiated by their optical impairment characteristics, such as attenuation, chromatic dispersion, polarization mode dispersion (PMD), four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

In some embodiments, PCE 130 may receive a path computation request from a Path Computation Client (PCC). The PCC may be any client application requesting a path computation to be performed by PCE 130. The PCC may also be any network component that makes such a request, such as control plane controller 120, or any NE 112, such as a ROADM or a FOADM. Generally, the PCC communicates with PCE 130 using PCEP or network configuration (Net-Cont) protocol, although other acceptable communications protocols may be used as well.

There may be many types of path computation constraints that can affect the path computation. In one embodiment, the path computation constraints include optical quality constraints. Examples of such include the optical signal to-noise ratio (OSNR), amplifier spontaneous emission (ASE), PMD, polarization-dependent loss (PDL), coherent optical crosstalk, incoherent optical crosstalk, effective passband, gain non-uniformity, gain transients, and chromatic dispersion. In some embodiments, the path computation constraints may be classified as linear in that their effects are independent of the optical signal power and they affect the wavelengths individually. Alternatively, the path computation constraints may be classified as nonlinear in that their effects are dependent of the optical signal power, generate dispersion on a plurality of wavelength channels, and induce crosstalk between wavelength channels. Regardless, the path computation constraints are communicated to the PCE 130 so that the PCE 130 may consider them when computing a signal's path through WSON 100.

Figure 2:
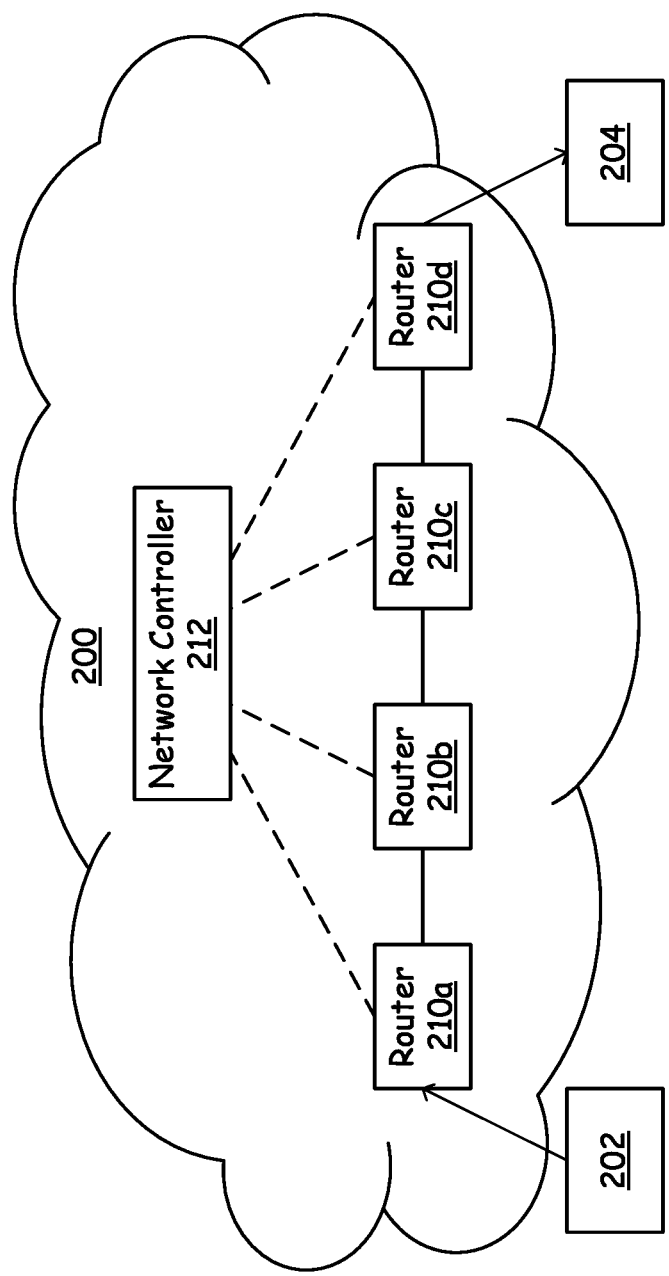
FIG. 2 is a diagram of a Multiprotocol Label Switching (MPLS) network employing a Path Computation Element (PCE) based architecture, according to various embodiments of the present disclosure.

FIG. 2 illustrates Multiprotocol Label Switching (MPLS) network 200 employing a Path Computation Element (PCE) based architecture, according to various embodiments of the present disclosure. MPLS network 200 includes multiple network elements (NEs), such as routers 210a, 210b, 210c, and 210d, any or all of which can be implemented as reconfigurable optical add/drop multiplexers (ROADMs). While only four routers 210 are shown in FIG. 2, an MPLS network generally includes significantly more than four routers 210. Each of the routers 210 can also be referred to more generally as a node, or network element (NE) of MPLS network 200.

FIG. 2 also shows how MPLS network 200 can be used to transport one or more packets from a first device 202 to a second device 204, both of which are communicatively coupled to the MPLS network 200. FIG. 2 also illustrates a network controller 212 that is communicatively coupled to each of the routers 210 of the MPLS network 200, as represented in dashed lines. The network controller 212 can be implemented as, for example, a software-defined network (SDN) controller used to perform a variety of control path and/or control plane functions.

The control plane MPLS network 200 is the part of the router architecture responsible for collecting and propagating the information that will be used later to forward incoming packets. Routing Protocols and label distribution protocols are parts of the control plane. The control plane is responsible for exchanging layer 3 routing information and labels. By contrast, a data plane of an MPLS network is responsible for forwarding packets based on labels and IP header. The data plane can have a simple forwarding engine that maintains a Label Forwarding Information Base (LFIB), which is a table a router uses to forward labelled packets through a network, and a Forwarding Information Base (FIB), which is a table that a router looks at when deciding where to forward traffic.

As noted above, the router 210 can also be referred to as a node, or network element (NE) of MPLS network 200. When MPLS network 200 is used to transfer one or more packets from the first device 202 to the second device 204, the router 210a can be more specifically referred to as an ingress router or ingress node, and the router 210d can be more specifically referred to as an egress router or egress node. Even more specifically, the ingress router 210a can be referred to as a Label Edge Router (LER), which is a router that first encapsulates a packet inside an MPLS Label Switched Path (LSP), wherein the MPLS LSP is essentially a unidirectional tunnel between a pair of routers of an MPLS network. The router 210d can be referred to more specifically as the egress router. Routers 210b and router 210c can be referred to more specifically as Label Switching Routers (LSRs), or transit nodes, which are routers that perform MPLS switching in the middle of an LSP. The router 210d, which as noted above can be referred to as the egress node, is the final router at the end of the LSP. Ingress router 210a and egress router 210d are also LSRs, but may perform additional functions by virtue of their placement at the edges of the MPLS network.

Where MPLS network 200 includes a WSON/SSON network, and routers 210a, 210b, 210c, and 210d include reconfigurable optical add/drop multiplexers (ROADMs), routers 210a, 210b, 210c, and 210d can also perform various optical switching and electro-optical conversion functions required to implement Label Switched Routing (LSR) in an optical network environment.

Figure 3:
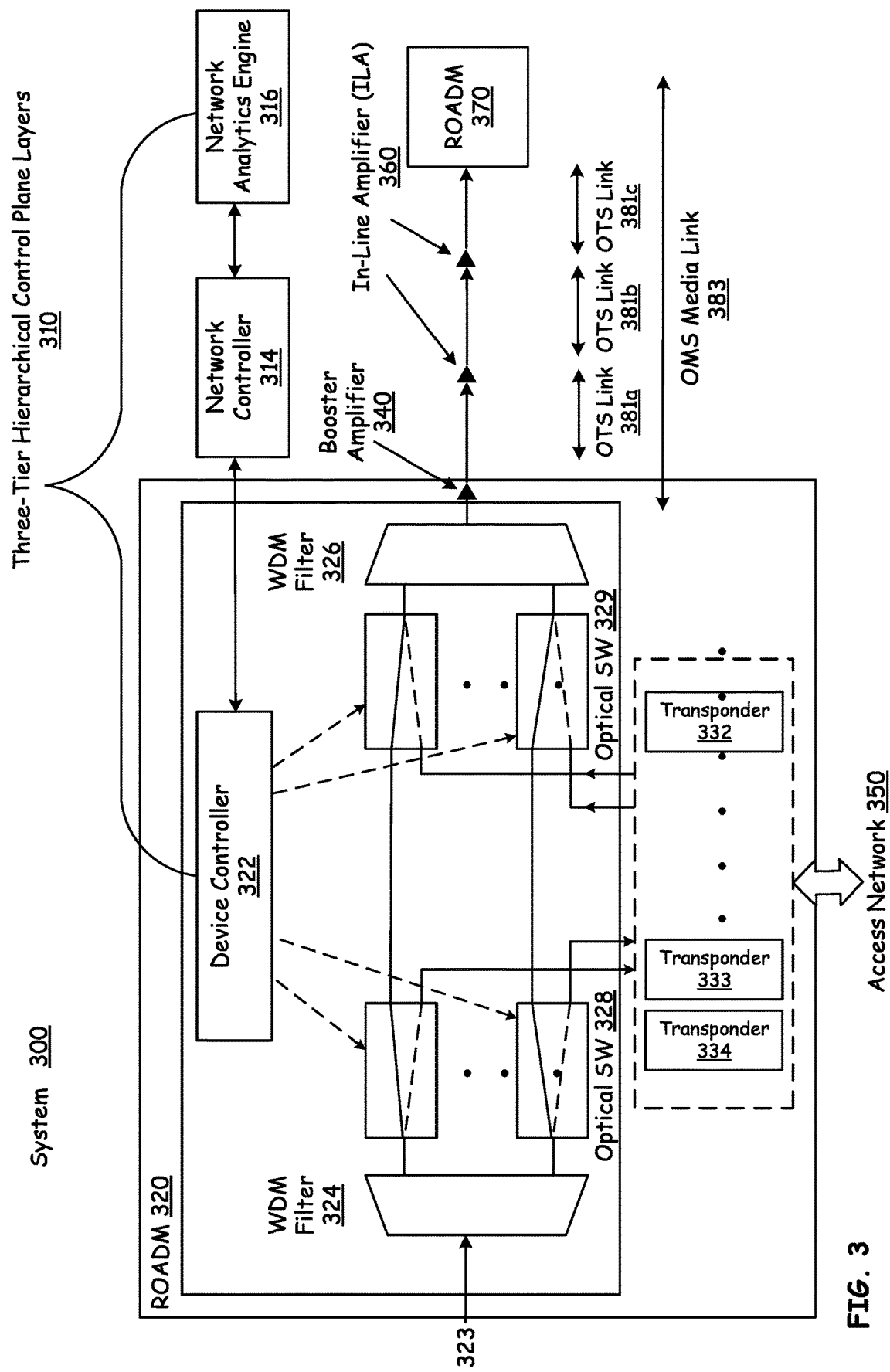
FIG. 3 is a diagram of a Wavelength Switched Optical Network (WSON) system that includes multiple control layers, according to various embodiments of the present disclosure.

Referring next to FIG. 3, a diagram of a Wavelength Switched Optical Network (WSON) system 300 that includes multiple control layers will be discussed in accordance with various embodiments of the present disclosure. System 300 includes reconfigurable optical add/drop multiplexer (ROADM) 320, network controller 314, network analytics engine 316, ROADM 370, and in-line amplifiers (ILAs) 360.

ROADM 320 includes device controller 322, WDM filter 324, WDM filter 326, optical switches 328 and 329, transponders 332, 333, and 334, and booster amplifier 340. ROADM 320 is illustrated as an edge device including transponders 332, 333, and 334, which couple to access network 350. But in some embodiments where ROADM is not an edge device, transponders 332, 333, and 334 could be optional.

Consider first an example of operation in which ROADM 320 is an edge device, and access network 350 is a non-optical network, e.g., an electrical network that uses electromagnetic signals other than light to transmit information. Transponders 332, 333, and 334 convert full-duplex electrical signals from access network 350 to full-duplex optical signals, and vice versa. In some implementations, transponders 332, 333, and 334 can be replaced by transceivers, which also convert electrical signals from access network 350 to full-optical signals, but are not capable by performing optical-to-optical conversion.

Optical signals generated by transponders 332, 333, and 334 are routed to WDM filter 326 through optical switches 329. Device controller 322 controls optical switches 329 to route multiple optical signals having different wavelengths to WDM filter 326, which multiplexes the multiple optical signals onto a single physical fiber. Booster amplifier 340, as the name implies, boosts the combined optical signals for transmission to ROADM 370 through ILAs 360.

Consider next an example of operation in which ROADM 320 is an edge device, and access network 350 is an external optical network. In this case transponders 332, 333, and 334 can be implemented as optical-electrical-optical transponders, which convert an optical input signal from access network 350 into electrical form, generate a logical copy of an input signal, and use this signal to drive a transmitter to generate an optical signal at a new (or the same) wavelength, hence "optical-electrical-optical." Once the optical signals are generated by transponders 332, 333, and 334, operation is the same as discussed above.

In an example of in-network operation, e.g., where ROADM 320 is not an edge node or device, a combined optical signal including multiple optical signals having different wavelengths can be received at input 323 of ROADM 320, and sent to WDM filter 324, which de-multiplexes the combined optical signal and routes different wavelengths through optical switches 328. Device controller 322 controls optical switches 328 to the individual optical signals to either optical switches 329, or transponders 332, 333, and 334, which prepare the optical signals for transmission via access network 350. Although not specifically illustrated, ROADM 320 can be optically coupled to another ROADM via input 323.

Still referring to FIG. 3, in various embodiments, the control function of WSON/SSON system 300 is partitioned across device controller 322, network controller 314, and network analytics engine 316, with each of the device controller 322, network controller 314, and network analytics engine 316 being primarily responsible for implementing one of the three-tier hierarchical control plane layers 310.

In various embodiments, device controller 322, implements a first layer, referred to herein as a device-level control plane layer, which performs local fault control and management. For example, if device controller 322 becomes aware of a link impairment of Optical Multiplexing Section (OLS) media link 383 or Optical Transmission Section (OTS) link 381a, device controller can attempt to take an action to minimize the impact of the impairment. Examples of link impairments include breaks in a fiber, excessive optical signal-to-noise ratio (OSNR), excessive chromatic dispersion, excessive polarization mode dispersion, and/or other linear or non-linear phenomena that affect the quality or speed at which data is transported through a network. In some cases, impairments are can result from changes in the intensity of the optical field due to modulation of the signal amplitude. Signal-induced refractive index fluctuations can affect the phase of the optical signal. During transmission in dispersive fiber, the fluctuations in phase are converted into intensity variations, which can distort the waveform shape.

Device controller 322 can identify link impairments by receiving a message from network controller 314; by receiving notification messages from another device, such as a corresponding device controller in ROADM 370 (not explicitly illustrated); using physical detection circuitry, such as power sensors; by performing data analysis on data sampled from a packet being transmitted through the network; or by performing phase and/or amplitude analysis on a signal being transmitted along a lightpath. For example, an optical power level used for transmitting data over a particular link can be measured to determine whether a link impairment is degrading the quality of a signal at WDM filter 324 or WDM filter 326, where the impairment could lead to reception or transmission errors. As another example, an optical signal-to-noise ratio (OSNR) can be measured to determine whether the OSNR is less than a threshold value necessary to obtain a target bit error rate (BER).

In some instances, device controller 322 can determine that WDM Filter 324 or WDM filter 326 are introducing errors during signal spectrum filtering, or whether optical switches 328 or optical switches 329 are introducing noise. Similarly, if device controller 322 determines that the optical signal at booster amplifier 340 is non-impaired, but the signal is impaired by the time it reaches one of the ILAs 360, or ROADM 370, device controller 322 can determine that one of the OTS links 381a, 381b, or 381c is impaired, and/or that OMS media link 383 is impaired.

Network controller 314, implements a second control plane layer, referred to herein as a network-level control plane layer, which includes network-level fault control and management. Network-level fault control and management can include selecting and setting up initial network paths; gathering link impairment information from network elements, nodes and devices; selecting and setting up alternative network paths; performing various routing and wavelength assignment (RWA) functions; and the like. Information regarding details of the RWA process and WSON subsystems and their properties can be found in Internet Engineering Task Force (IETF) Request for Comments 6163 (RFC6163), DOI 10.17487/RFC6163, April 2011, <https://www.rfc-editor.org/info/rfc6163>, entitled "Framework for GMPLS and Path Computation Element (PCE) Control of Wavelength Switched Optical Networks (WSONs)," which is incorporated herein by reference.

In various embodiments, network controller 314 receives information related to the performance of local links, e.g. OTS links 381a-381c or OMS media link 383, from network elements ROADM 320, ROADM 370, and ILAs 360. These network elements, and others, function individually and in combination to provide link performance/impairment/status information to network controller 314, which can use the information directly to identify active impairments and adjust data paths as necessary, and/or pass on the link performance/impairment/status information to network analytics engine 316, which can use the information to determine predicted link impairments. In some embodiments, network controller 314 can also set up a "section trace" (a regenerator overhead identifier) between two nodes or network elements, e.g., between booster amplifier 340 and ILA 360, or between ROADM 320 and ROADM 370. However, in various embodiments discussed herein, identification of actual and predicted link impairments is performed based on link performance/impairment/status information reported to network controller 314 by individual network element, and forwarded to Network analytics engine 316.

As used herein, the phrases "link performance information," "link impairment information," and "link status information" are used interchangeably, and should considered to be the same, unless otherwise required by the context. For example, link performance information regarding a non-impaired link can still be considered to include link impairment information, because the link performance information can be used to determine that no link impairment exists. In other cases, link impairment information can specify one or more particular impairments, and timing information associated with those impairments. Link performance information can be sent by network elements periodically, in response to a query, or in response to the occurrence of an active link impairment. In a similar manner, link status information could be as simple as "link functioning properly" or "link not functioning," or could include detailed information specifying particular impairments currently associated with the link, or one or more link performance parameters, e.g., an OSNR associated with a link, a power level associated with a link, or the like.

Network analytics engine 316 can be used to implement a third control plane layer, referred to herein as an analysis control plane layer. Although network analytics engine 316 is illustrated as a separate device from network controller 314, in at least one implementation network controller 314 includes network analytics engine 316, and both are implemented using at least some shared hardware components. In at least one embodiment, network analytics engine 316 is an artificial intelligence engine programmed to predict upcoming link impairments by maintaining a link performance history of each network link. The history can be constructed based on link performance, link impairment, and/or link status information forwarded by network controller 314, by receiving link performance/impairment/status information directly from one or more network elements such as ROADM 320, ILAs 360, and ROADM 370, or by some combination thereof.

In various embodiments, messages transmitted from the network elements to network controller 314 include timing information identifying a time at which various performance parameters, the link to which the performance information applies, and a source of the performance parameters. The messages can also, in some instances, specify identified impairments and the time those impairments occurred, types of impairments, or the like. The historical occurrence of link impairments can be used to iteratively refine predictions of future occurrences of link impairments.

For example, a system wide threshold value of 50% can be set, so if a particular link experiences an impairment at a particular time of day on a particular day of the week at least 50% of the time, an impairment of that link will be predicted. Continuing with this example, if a first link experiences an impairment only 40% of the time on Mondays at 7:32 pm, no impairment will be predicted for that time, but if an impairment of second link is reported 52% of the time on Mondays at 7:32 pm, network analytics engine 316 can generate a prediction that the second link will experience an impairment on the next Monday at 7:32 pm. If an impairment of the first link occurs despite no prediction being issued, the threshold for predicting an impairment can be lowered to, for example, 45%, based on an algorithm that reduces the threshold value by 10% in cases where no impairment is predicted, but an actual impairment nevertheless occurs.

Of course, the above example is very simplistic, and far more complex algorithms than the one disclosed can be used, taking into account many more variables and combinations of variables, such as degree of the impairment, data rate, data type, data source, data destination, light wavelength, time between impairments, hardware identifiers of various network elements included in the path, other network traffic on the same fiber, quantity or type of traffic being handled by a network element reporting adjacent to the link under consideration, and the like. Furthermore, thresholds for predictions can be established on a per-link, per-lightpath, per-device basis, or other basis.

In various embodiments, device controller 322, network controller 314, and network analytics engine 316, can cooperate with each other to perform functions used in the various control plane layers of the three-tier hierarchical control plane layers 310. For example, device controller 322 participates in the network-level control plane layer and the analysis control plane layer by transmitting link status messages to network controller 314, which forwards the information included in the link status messages to network analytics engine 316. Network controller 314 uses the link status information transmitted by device controller 322, along with link status information from other network elements, to make network-level routing decisions, such as identifying and establishing data paths through the network. Network analytics engine 316 uses the link status information provided by device controller 322 to establish time-based link histories used to anticipate and predict link impairments on a per-link level, on a per-lightpath level, on a network-wide level, or some combination thereof. Thus, while device controller 322 is used to implement a device-level control plane layer, device controller 322 also participates in implementation of the network-level control plane layer and the analysis control plane layer by cooperating with network controller 314 and network analytics engine 316.

Network controller 314 participates in implementation of the device-level control plane layer by providing information and control signals to device controller 322 that allows device controller 322 to properly route particular wavelengths of light through the network. Network controller 314 participates in implementation of the analysis control plane layer by forwarding link status information received from various network elements to network analytics engine 316, and by using prediction information received from network analytics engine 316 to inform routing decisions regarding initial lightpaths and to initiate selection of potential alternative lightpaths in some cases. Additionally, network controller 314 uses information regarding actual link impairments received from device controller 322, and/or other network elements, to verify that predicted link impairments identified by Network analytics engine 316 actually occur.

Likewise, network analytics engine 316 participates in implementing the device-level control plane layer and the network-level control plane layer, by evaluating device-level and network-level information to predict link impairments that might require network level action by network controller 314 to choose an alternative lightpath, and/or predicted link impairments that can be addressed at the device level by, for example, using device controller 322 to increasing the gain of booster amplifier 340.

Figure 4:
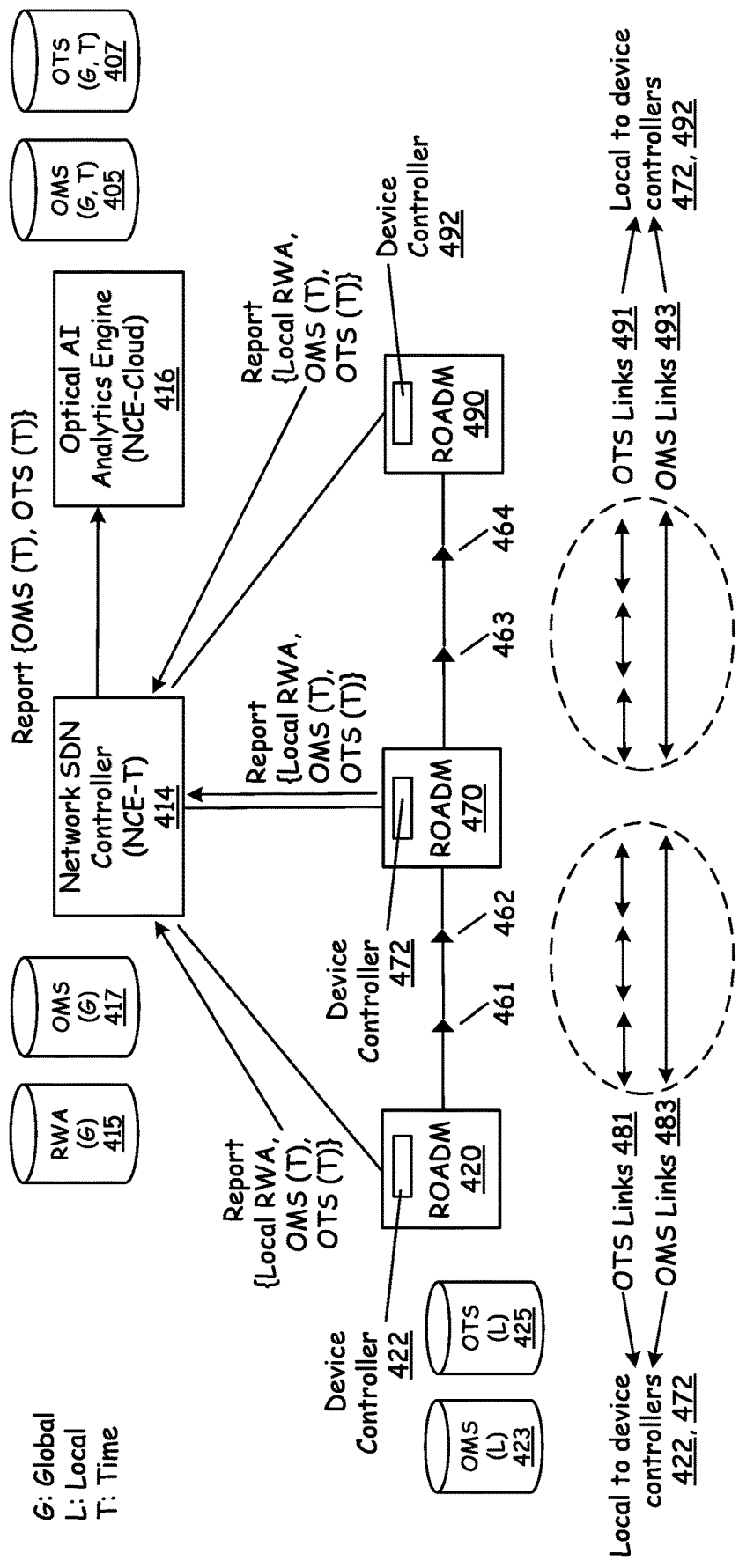
FIG. 4 is a diagram illustrating information flow in, and hierarchical control of, a Wavelength Switched Optical Network (WSON), according to various embodiments of the present disclosure.

Referring next to FIG. 4, hierarchical control of Wavelength Switched Optical Network (WSON) 400 will be discussed in accordance with various embodiments of the present disclosure. WSON 400 is an impairment-aware network. WSON 400 includes network controller 414, illustrated as a software-defined-network (SDN) controller, which is also referred to as a network control element (NCE) or time-based network control element (NCE-T); analytics engine 416, also referred to as an optical artificial intelligence (AI) analytics engine, or cloud based network control element (NCE-Cloud); and reconfigurable optical add/drop multiplexers (ROADMs) 420, 470, and 490.

Reconfigurable optical add/drop multiplexers (ROADMs) 420, 470, and 490 are connected to each other via Optical Multiplexing Section (OMS) media links 483, 493 and Optical Transmission Section (OTS) links 481, 491, and to network controller 414 via a signaling, backchannel, control, or other network separate from optical portion of WSON 400 used for data routing. This separate signaling network can include either or both optical and non-optical links and protocols. For example, the signaling network can include a non-optical network, i.e., an electrical network that uses electromagnetic signals other than light to transmit information. Such non-optical communication networks can include a dedicated backchannel network that uses peer to peer communication links between individual devices, a Transmission Control Protocol/Internet Protocol (TCP/IP) network, local area networks, wide area networks, personal area networks, or some combination thereof. The signaling network can employ any of various network protocols supported by the individual devices, such as Ethernet, token ring, Fiber Distributed Data Interface (FDDI), or the like. The signaling network can employ either wireless communication channels, wired communication channels, optical communication channels, or some combination thereof. In some embodiments, ROADMs 420, 470, and 490 are connected to each other via optical links for movement of data through WSON 400, and via signaling, backchannel, or control links (not illustrated) for transmission of control, or other information.

In various implementations, each ROADM includes a device controller; ROADM 420 includes device controller 422, ROADM 470 includes device controller 472, and ROADM 490 includes device controller 492. Device controllers 422, 472, and 492 provide control functionality for their respective ROADMs 420, 470, and 490, allowing each ROADM to route optical signals under control of network controller 414, and to cooperate with network controller 414 and analytics engine 416 to implement a multi-tier hierarchical control of WSON 400.

For example, device controllers 422, 472, and 492 obtain link status of local links, and pass link status information to network controller 414, which in turn provides the link status information to analytics engine 416. In at least one embodiment, the term "local links" refers to input and output links that connect one device to another. In some such embodiments, a communication links joining two ROADMs is considered to be local to both ROADMS, because the link serves as an output path for one ROADM, and an input path to another ROADM. As illustrated in FIG. 4, OTS links 481 and OMS links 483 are local to both ROADM 420 and ROADM 470, while OTS links 491 and OMS links 493 are local to both ROADM 470 and ROADM 490. In some implementations either input or output links may be considered local links for monitoring and reporting purposes.

In some embodiments, in-line amplifiers 461, 462, 463, and 464 are capable of reporting link status to network controller 414. In some such embodiments, a communication link between in-line amplifier 461 and in-line amplifier 462 is considered local to both in-line amplifiers, in addition to being considered local to ROADM 420 and ROADM 470. In some implementations, particularly where in-line amplifiers have limited reporting capabilities, the in-line amplifiers do not report link status to network controller 414; instead the link status of a link between two in-line amplifiers is reported to network controller 414 by a ROADM or other device including a device controller.

Each device controller, or its associated ROADM, can include local storage used to store link statuses associated with links local to that device controller. For example, OTS links 481 and OMS links 483 are local to device controller 422. Information associated with the status of OTS links 481 can be stored in local OTS database 425, and the status of OMS links 483 can be stored in local OMS database 423. Local OTS database 425 and local OMS database 423 can be maintained separately, or as a single unit. In some embodiments they may be relatively complex relational databases, linked lists, a first-in-first out (FIFO) or first-in-last-out (FILO) data queue stored in an order based on the time the data was received. In various embodiments, link status information can be organized on a per-link basis, so that all status information for a particular link is grouped together; on a per-status basis, so that all links experiencing the same or a similar issue are grouped together; on a time-of-occurrence basis, so that all link statuses associated with a particular time frame are stored together; or on some other suitable basis.

As used herein, the terms "link status" and "link state" are used interchangeably, and are to be understood as synonymous unless the context requires otherwise. The link status information maintained in local OTS database 425 and/or local OJVIS database 423 includes, but is not limited to, one or more of the following: a source-node identifier, a destination-node identifier; a channel frequency; OJVIS level routing and wavelength assignment (RWA) availability, a time associated with the OJVIS level link state; a time associated with the OTS level link state; a link identifier, a link type identifier, information indicating whether the link state applies at the channel level or the fiber level; information associated with signal quality, or impairment, such as total link power, Optical Signal to Noise Ratio (OSNR), polarization mode dispersion (PMD), bit error rate (BER), or quality factor (Q-Factor).

In various embodiments, in addition to storing link status information in local OTS database 425 and local OMS database 423, device controller 422 triggers local-level fault reports to network controller 414 in response to detecting signal quality degradation. In some embodiments, rather than sending reports only when triggered by signal quality degradation, reports can be sent periodically, in response to a request, based on a schedule, or some combination thereof. Device controllers 472 and 492 function in a manner similar to device controller 422, but with respect to different local links.

Network controller 414 receives link state/status information from ROADM 420, ROADM 470, and 490, collects and processes the link state/status information to assist in implementing the multi-tier hierarchical control of WSON 400, and reports the link state/status information to analytics engine 416. Network controller 414 also maintains network-wide routing and wavelength assignment (RWA) information, and uses the RWA information to generate both initial and modified end-to-end paths through WSON 400. Network controller 414 transmits control signals to various devices included in WSON, including ROADMs 420, 470, and 490 instructing those devices how to route data through WSON 400.

Network controller 414 stores link state/status information received in reports from device controllers 422, 472, and 492 in a locally accessible memory, such as global RWA database 415 and global OMS database 417. Network controller 414 can also store information related to Optical Transmission Section (OTS) link states in a separate database (not illustrated). Global RWA database 415 and a Global OMS database 417 can also be implemented in various data structures, similar to local OTS database 425 and local OMS database 423. In some embodiments, rather than using separate databases, a single database is used to store both information related to global RWA, global OMS link states, and global OTS link states. In some embodiments, information related to routing and wavelength assignment (RWA) can be stored separately from information related to impairments of Optical Multiplexing Section (OMS) media links. Regardless of how the information is stored, network controller 414 uses the RWA and link status information to identify potential paths through the WSON/SSON, identify current impairments in established or potential network paths, select initial and modified network paths from among the potential paths, transmit data and other control signals to network elements, e.g., ROADMs 420, 470, and 490, to establish the initial and modified network paths selected.

In at least one embodiment, network controller 414 cooperates with analytics engine 416 to select a potential path for implementation. This cooperation can include sending reports to analytics engine identifying links included in the potential paths, receiving information about potential impairments of the identified links from analytics engine 416, and selecting a particular link based on current impairment information stored in global OMS database 417, potential impairments identified in the information proved by analytics engine 416, and RWA information included in global RWA database 415.

Analytics engine 416 keeps historical OMS and OTS data for time-based analysis of link state data for prediction of signal quality degradation. The historical OMS and OTS data can be received from network controller 414, and stored in a global, time based, OMS database 405, and/or global, time based, OTS database 407.

When analytics engine 416 predicts that an OMS or OTS link will experience an impairment, or if analytics engine 416 identifies a degradation in signal quality that is not large enough to trigger an error reporting threshold, but is nevertheless more than a threshold amount below an expected signal quality based on a historical analysis of signal quality, analytics engine 416 can transmit an impairment alert, or warning, to network controller 414. The impairment alert can trigger network controller to reconfigure and reroute an established lightpath through WSON 400. In some embodiments an impairment alert from analytics engine 416 causes network controller 414 to generate multiple potential alternative paths that avoid a predicted link impairment. But network controller 414 may not reroute data unless a confirmation of an actual link impairment is received from ROADM 420, 470, or 490.

In other embodiments, for example where an impairment alert is based on a signal degradation identified based on historical analysis, or where an impairment is predicted but does not occur as predicted, network controller 414 can take that information into account when choosing future lightpaths through WSON 400, even if a current lightpath is not altered in response to the impairment alert.

Analytics engine 416 can be implemented as a cloud-based service using one or more processing devices. In other implementations, analytics engine 416 is included in network controller 414, or is implemented as a standalone server or other networked device.

Figure 5:
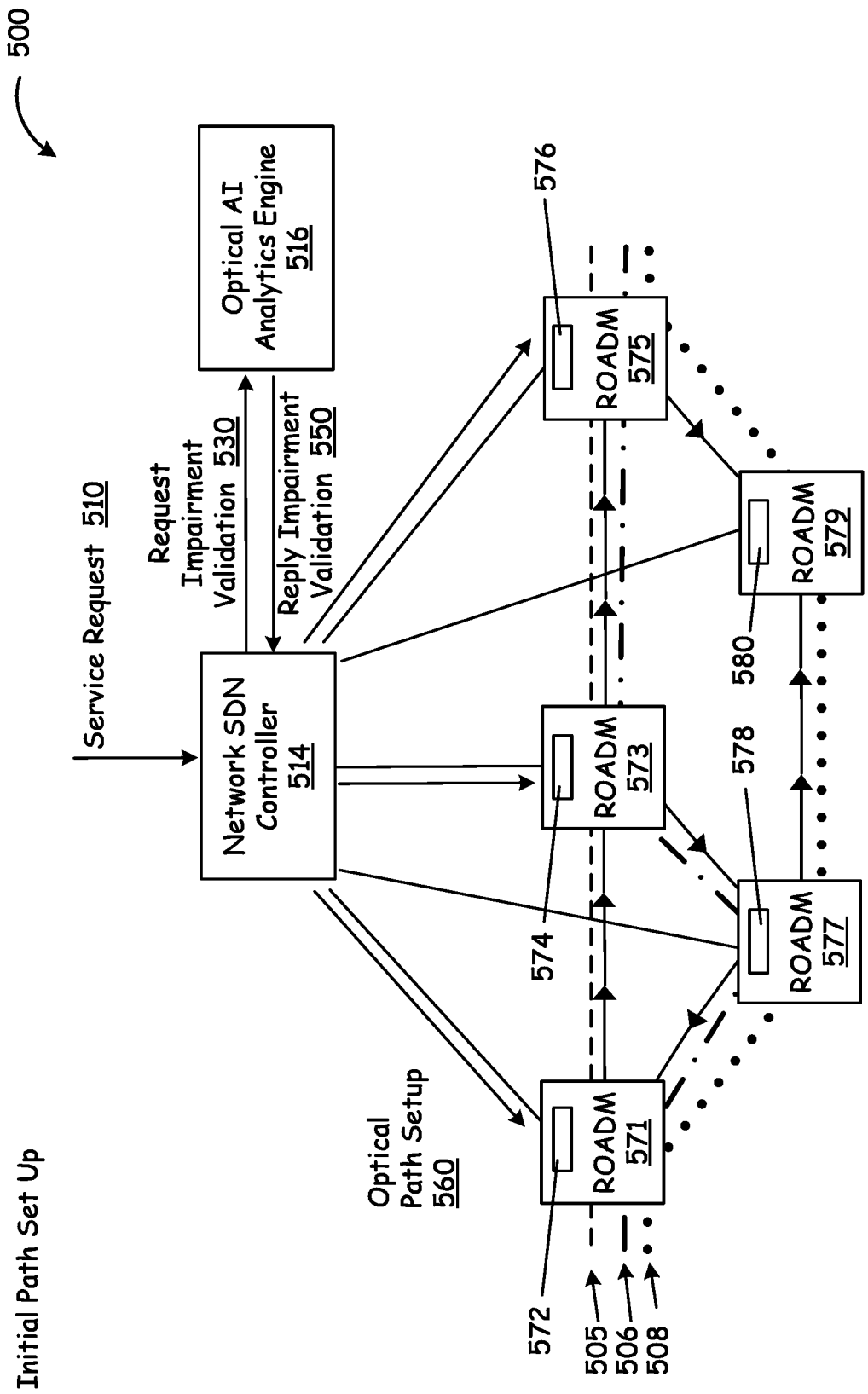
FIG. 5 is a diagram illustrating initial path setup in a Wavelength Switched Optical Network (WSON), according to various embodiments of the present disclosure.

Referring next to FIG. 5, setup or provisioning of an initial lightpath, such as path 505, through Wavelength Switched Optical Network (WSON) 500 will be discussed in accordance with various embodiments of the present disclosure. Setup of an initial path 505 can begin with network controller 514 receiving service request 510 from a device desiring to transmit data through WSON 500. Service request 510 can include information identifying a source of the request, a type of data to be transmitted, service quality parameters associated with the request, or the like. Although not specifically illustrated, network controller 514 can transmit a response to the service request, where the response includes information identifying an ingress node to WSON 500, as well as information related to optical signal compatibility such as supported forward error correction (FEC) modes, supported modulation formats, or the like.

In response to receiving the service request, network controller 514 applies an RWA algorithm to determine feasible end-to-end paths through WSON 500 that are free of current impairments. These RWA algorithms can be chosen to achieve, for example, a minimum transit time through WSON 500, a minimum number of frequency changes along the lightpath, a minimum number of nodes, maximum usage of available physical resources, such as maximizing the number of light frequencies transmitted through a particular fiber bundle, a minimum cost of transmission, satisfaction of quality of service (QoS) requirements associated with the data to be transmitted along the path, or the like. The techniques disclosed herein are compatible with various known RWA algorithms, which can be modified in accordance with the teachings set forth herein or used in conjunction with various techniques disclosed herein. Thus, for example, if network controller 514 determines that no current link impairments exist, three feasible lightpaths, path 505, path 506, or path 508, may be chosen based on application of one or more RWA algorithms.

The number of feasible lightpaths may be limited to a subset of potential lightpaths that satisfy one or more network optimization or usage requirements, limited to a fixed number of potential lightpaths, limited to a number of lightpaths that can be determined using a maximum amount computational resources, or the like. In some embodiments all potential lightpaths are initially considered, and then reduced based on one or more feasibility criteria, such as length of transmission time via the path, number of nodes in the path, computational resources required to use the path, or the like. In some embodiments, once the feasible lightpaths have been selected from among all potential lightpaths, the feasible lightpaths are referred to as potential lightpaths, as opposed to non-feasible lightpaths which are no longer potential lightpaths. In general, the term "potential" paths as used herein refers to "feasible" paths that have not yet been selected to be setup for use in transmitting data through WSON 500.

Once network controller 514 has determined a set of potential lightpaths, network controller transmits request for impairment validation 530 to analytics engine 516. Request for impairment validation 530 may request analytics engine 516 to perform validations on a per-path basis, a per-segment basis, or a per-link basis. In some embodiments, performing validations on a per-path basis results in analytics engine 516 replying to network controller 514 with an impairment validation 550 indicating that at least one link along the path is predicted to experience an impairment, without identifying the impaired link. Performing validations on a per-segment basis, where a segment includes multiple links but not an entire end-to-end path, results in analytics engine 516 replying to network controller 514 with an impairment validation 550 indicating that at least one link included in the segment is predicted to experience an impairment, without identifying the impaired link. Performing validations on a per-link basis results in analytics engine 516 replying to network controller 514 with an impairment validation 550 indicating that a particular link is predicted to experience an impairment, independent of path or path-segment.

The type of validation performed can affect the information transmitted from network controller 514 to analytics engine 516, and in some instances can reduce the need to transmit duplicate items between network controller 514 and analytics engine 516. For example, when an impairment validation is to be performed on a per-path basis, a path identifier, along with information identifying each link in the path, is sent to analytics engine 516, which tests each link for potential impairment and notifies network controller 514 that the identified path is predicted to experience an impairment if any link in the path is predicted to experience an impairment. In some implementations, analytics engine 516 can provide information identifying the particular link associated with the predicted impairment, in addition to notifying network controller 514 that an impairment is predicted somewhere along the path. In some such embodiments, a type of impairment and a severity indicator can also be provided to network controller 514.

If impairment validation is requested on a per-link basis, network controller 514 can make a list of all links included in all of the potential paths and send that list of links to analytics engine 516. Analytics engine 516 can reply to network controller 514 with impairment validation 550, which specifies impairment prediction results for each link. Network controller 514 can apply the link impairment predictions included in impairment validation 550 to choose one of the potential paths to setup.

In response to receiving impairment validation 550 from analytics engine 516, network controller 514 selects the most optimal path of the potential paths, such as paths 505, 506, and 508 to set up. In the example illustrated in FIG. 5, path 505 is selected as the optimal path. The selection can be made by removing any potential paths including links predicted to experience impairments from consideration as the optimal path, and then selecting the optimal path from among the remaining potential paths. Alternatively, the potential path having the fewest links predicted to experience impairments can be selected as the optimal path, the potential path having the fewest number of predicted impairments can be selected as the optimal path, the potential path having the least serious predicted impairment can be selected as the optimal path, or the like.

In some implementations, weighting factors can be applied to various factors, and the optimal path can be selected based on some weighted combination of factors. For example, the potential paths may be ranked by network controller 514 based on QoS, and impairments can be assigned a weight by the likely effect of the impairment on QoS. A weighting multiplier can be applied where multiple links in a particular path are predicted to experience impairments. Thus, in one example, path 506 may be ranked highest in QoS, assuming no impairments, and path 505 may be ranked lowest in QoS assuming no impairments. But if 506 has a single link predicted to experience an impairment that would severely impact the QoS along path 506, path 506 can be ranked lower than path 505.

In other examples, path 505 may be the only potential path without a link predicted to experience an impairment. In yet another example, where transmission time through WSON 500 is deemed the most crucial factor in choosing an optimal path, path 505 may have multiple links predicted to experience an impairment, and path 508 may have no links predicted to experience impairments. But if the impairments predicted for links included in path 505 will have minimal impact on transmission time through the network, path 505 may still be deemed optimal if path 505, even with impairments, would provide a faster transmission time than path 508 without impairments. Other example implementations can be instituted in accordance with the teachings set forth herein.

Once network controller 514 determines that path 505 is the optimal path, network controller 514 sets up path 505 by transmitting optical path setup information 560 to controllers 572, 574, 576, 578, and 580, which are included in ROADMs 571, 573, 575, 577, and 579. Optical path setup information 560 can include control signals, RWA information, and/or other information used to provision, or set up, path 505.

Figure 6:
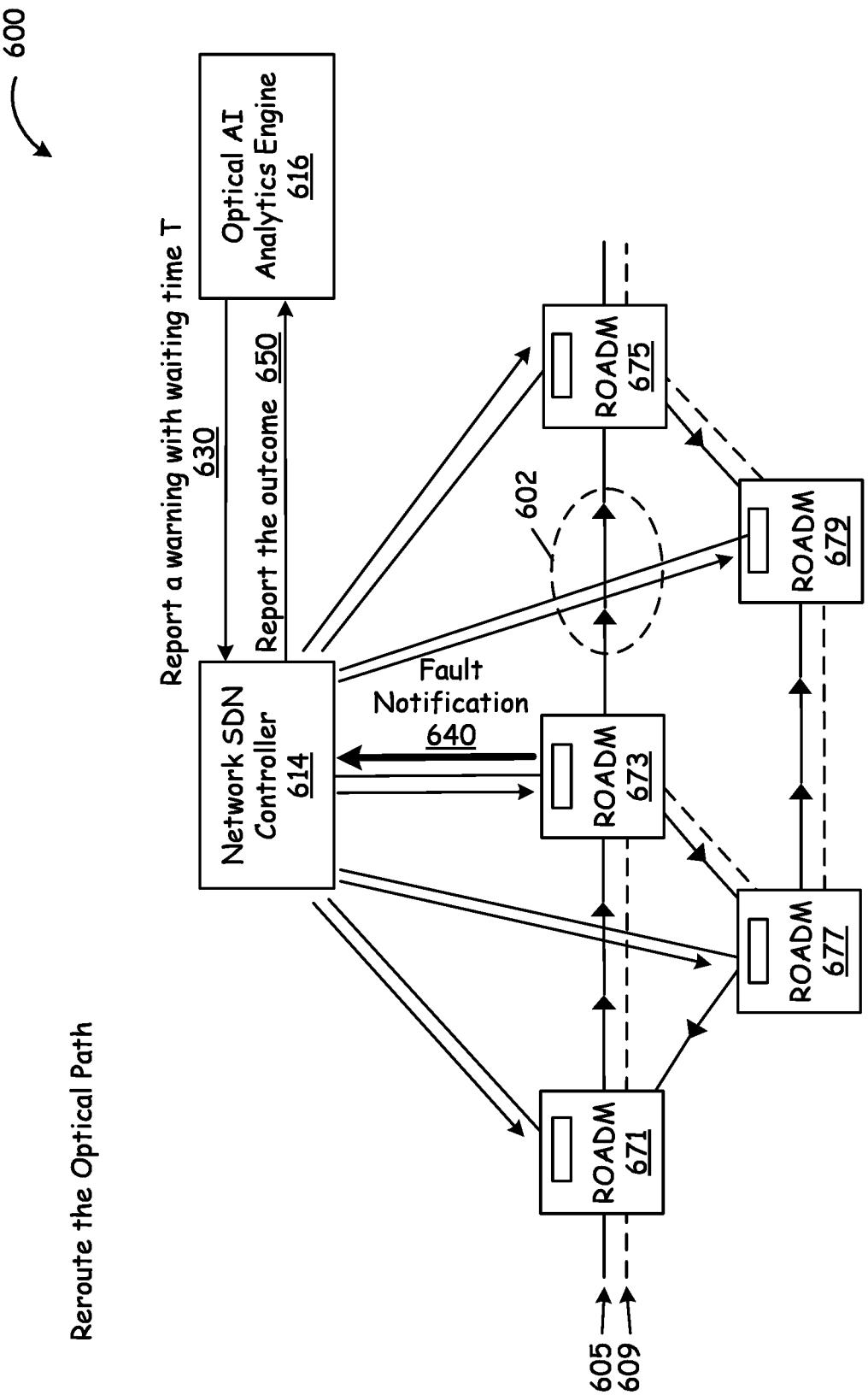
FIG. 6 is a diagram illustrating rerouting an optical path in a Wavelength Switched Optical Network (WSON), according to various embodiments of the present disclosure.

Referring next to FIG. 6 rerouting an established optical path through Wavelength Switched Optical Network (WSON) 600 will be discussed in accordance with various embodiments of the present disclosure. The following discussion assumes that initial optical path 605 through WSON 600 has previously been established. Although the initial setup of optical path 605 can be performed using the techniques disclosed by FIG. 5, rerouting an already-established path, as discussed herein, does not require the already established path to have been set up using any particular technique.

As illustrated by FIG. 6, analytics engine 616 makes a prediction that optical link 602 will experience an impairment at an estimated time. The estimated time can be an exact time, or a time range, and may be precise to a month, a week, a day, an hour, a second, or some portion of any of those periods of time. Thus, the estimated time can indicate that optical link 602 is predicted to experience an impairment between 1:01:15 am and 1:01:16 am on Jan. 1, 2040, between 5:00 pm and 6:01 pm on the current day, or the like.

Determining that optical link 602 is predicted to experience an impairment can be performed based on historical link state/status information reported by network elements, e.g., ROADMs 671, 673, 675, 677, and 679, to network controller 614 and forwarded to analytics engine 616. In general, each network element reports link state/status and an associated time to network controller 614. The time reported by the network elements to network controller 614 can represent a time the impairment occurred, a time the impairment was reported, or the like.

Local link states can be reported to network controller 614 periodically, in response to a query from network controller 614, based on a schedule, in response to the network element detecting or being informed of an impairment, or the like. Network controller 614 can to provide analytics engine 616 information received from the network elements upon receipt, based on a schedule, periodically, in response to a query from analytics engine, in response to a fault notification from a network element, or the like.

Analytics engine 616 can analyze the historical link states, including information relating to impairments associated with particular links, timing associated with the impairments, characteristics of data being transmitted during an impairment, and the like to predict future impairments of particular links, including a predicted time of impairment. In at least some embodiments, if the likelihood that a link will experience an impairment exceeds a threshold value, analytics engine 616 can issue a warning message 630 to network controller 614. In some implementations, analytics engine can maintain information associating particular links with optical paths currently in use, which allows a warning to be issued only if a link predicted to experience an impairment link is currently in use. In other embodiments, a warning can be issued regardless of whether the link predicted to experience an impairment is currently in use. In at least some embodiments, when analytics engine 616 issues a warning, warning message 630 includes a waiting time "T." The waiting time instructs network controller 614 to wait a specified time interval before provisioning a new path to reroute data through WSON 600. Warning message 630 may or may not specify a predicted time of impairment, but instead can be issued by analytics engine 616 prior to the predicted time of impairment, with the waiting time "T" selected to take into account the predicted time of impairment.

In response to receiving warning message 630 from analytics engine 616, network controller 614 calculates one or more alternative lightpaths that avoid links predicted to experience impairments. For example, if optical path 605 is currently in use, and warning message 630 indicates that link 602 is predicted to experience an impairment, analytics engine 616 can select optical path 609 as an alternative lightpath, because optical path 609 avoids use of link 602.

At this point, however, even though optical path 609 has been selected, network controller 614 does not yet reroute data from optical path 605 to optical path 609. Instead, network controller 614 waits for confirmation of the predicted link impairment before rerouting data from optical path 605 to optical path 609. In at least one embodiment confirmation of a predicted link impairment can be received from a network element in the form of a fault notification. If no fault notification is received within the waiting period specified in warning message 630, optical path 609 is not provisioned, data continues to be transmitted through WSON 600 on optical path 605, and any potential alternative paths can be removed, or flushed from the memory of network controller 614. If, however, confirmation of a predicted link impairment is received within the waiting period specified in warning message 630, data is rerouted to optical path 609 from optical path 605. By pre-selecting an alternative path through a WSON/S SON, the impact of a link impairment that occurs can be lessened.

Network controller 614 can send an outcome report 650 to report the action taken in response to warning message 630. For example, if no action is taken because the predicted link impairment did not occur, that information can be included in outcome report 650. Likewise, if the predicted link impairment occurred within the waiting period, outcome report 650 can also include that information. Other information included in outcome report 650 can include identification of a network element that sent a fault notification, actual time of a reported impairment, time of an impairment relative to the waiting period, or the like. Analytics engine 616 can store the information included in outcome report 650 as historical data and use that data in future impairment predictions.

Consider the following example. Data is being transmitted through WSON 600 via optical path 605. Analytics engine 616 predicts impairment of link 602, and transmits warning message 630, which includes the link impairment prediction and a waiting time, to network controller 614. Network controller 614 selects optical path 609 as a potential alternative path through WSON 600 and starts a timer (not illustrated) to track the waiting period. Prior to expiration of the waiting period, as indicated by the timer, ROADM 673 detects an impairment in link 602, and transmits fault notification 640 to notify network controller 614 that an impairment of link 602 has occurred. Network controller transmits optical path rerouting instructions to ROADMs 671, 673, 675, 677, and 679 to setup, or provision, optical path 609, and to reroute data along optical path 609 instead of optical path 605. Network controller transmits outcome report 650 to notify analytics engine 616 that the predicted link impairment occurred within the waiting period. In some embodiments, information identifying the alternative data path, in this case optical path 609, can also be sent to analytics engine 616 in outcome report 650.

Figures 7, 8:
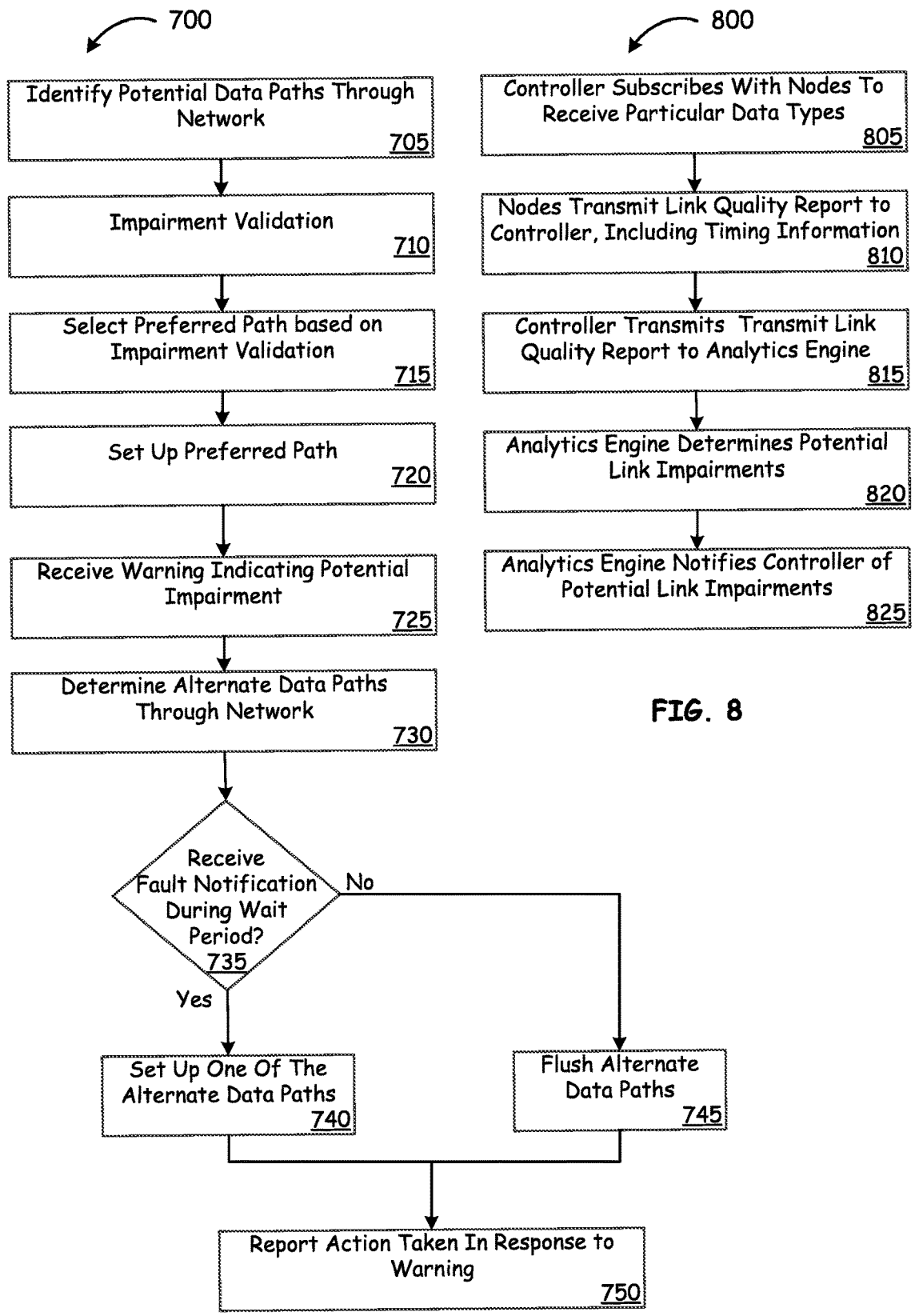
FIG. 7 is a flow diagram illustrating a method of controlling data paths to avoid link impairments, according to various embodiments of the present disclosure.
FIG. 8 is a flow diagram illustrating a method of obtaining and using data related to link impairments, according to various embodiments of the present disclosure.

Referring to FIG. 7, a method 700 of controlling data paths to avoid link impairments will be discussed according to various embodiments of the present disclosure. As illustrated by block 705 potential data paths through a network are determined. This determination can be performed as part of an initial path setup procedure by a network controller.

As illustrated by block 710, an impairment validation is performed on the potential data paths. This impairment validation can be performed by the same device that selects the potential data paths, or by another device tasked with analyzing historical link impairment and performance information. In some embodiments, the impairment validation includes both current and predicted link impairments. Based on the impairment validation, one of the potential data paths is selected as a preferred path, as shown by block 715. The preferred path is provisioned, or set up, as illustrated by block 720.

As illustrated by block 725, a warning indicating a potential, or predicted, impairment of a link included in the preferred path is received. This warning can be generated by the same device used to perform the impairment validation at block 710, although different criteria can be used for impairment validation and warning generation. For example, impairment validation may use an inclusion threshold that is either more or less stringent than a warning threshold.

In response to receiving the warning, potential alternative paths are determined in anticipation of a predicted link impairment occurring, as illustrated by block 730, and a waiting period begins. As illustrated by block 735, a decision is made regarding whether a notification of a fault notification is received during the waiting period. The fault notification indicates that an actual link impairment has occurred during the waiting period.

As illustrated by block 740, if an actual link impairment occurs during the waiting period, one of the potential alternative paths is set up, and data is rerouted from the preferred path to the alternative path that has just been set up path. If, however, no fault notification is received during the waiting period, the potential alternative paths are discarded, as indicated by block 745.

As illustrated by block 750, actions taken as a result the warning are reported, so that they can be used to inform future decisions to generate and send a predicted link impairment warning.

Referring next to FIG. 8, a method 800 of obtaining and using data related to link impairments will be discussed according to various embodiments of the present disclosure. As illustrated by block 805, a network controller subscribes with various nodes, or network elements, to receive data related to the state of links local to those nodes. The network node can subscribe to receive the same types of data from all network nodes capable of providing that type of information, or subscriptions can vary from node to node. For example, the network controller can subscribe to be provided first types of data from a first network node, and second, different types of data, from a second network node.

In various embodiments, subscribing can be performed via backchannel or control links, which the nodes also use to receive RWA information from the network controller. Subscribing can also include instructing the network elements regarding the circumstances in which information related to local link state/status is to be sent to the network controller.

As illustrated by block 810, the network nodes transmit a link quality report to the network controller. In some embodiments a fault notification is a specialized instance of a link quality report. The link quality report provides link state information related to links local to a particular network element, and a time associated with a reported link state. For example, each network element, e.g. a ROADM, obtains link state information about its local links, including link impairments and a time the link experienced the impairment. This link state information can be inserted into a link quality report and transmitted to the network periodically, in response to a query, when the quantity of stored link state information reaches a threshold level, when the link state information indicates an impairment meeting an impairment notification threshold, or some combination thereof. In some embodiments, a link quality report is transmitted at the first transmit opportunity after the link state information becomes available.

Local link state information can be determined by each network element based on measurements of transmitted data signals, such as signal strength, bit error rate, phase dispersion or distortion, or the like. In some cases, test signals can be transmitted by an upstream network element, assessed by a downstream network element, and the results reported to the upstream network element. The upstream network element can then report the results to the network controller. In some implementations, physical breaks in a transmission medium can be detected based on reflected power measurements, lack of data receipt at a downstream node, or the like. In some instances, repeated power increase commands can be an indication that a link is impaired. Other techniques for detecting and assessing link states can be employed without departing from the spirit and scope of the present disclosure.

As illustrated by block 815, the network controller receives link quality reports, sometimes referred to as local link quality reports, from network elements, and provides that information to an analytics engine, which may be part of the network controller, or implemented as a service or module on a separate physical device. The network controller can provide the analytics engine with the information contained in the local link quality reports by forwarding the local link quality reports to the analytics engine, or by extracting information from the local link quality reports and sending the local link state information to the analytics engine in a second link quality report, sometimes referred to herein as a network link quality report. Note that unless otherwise specified, the term "link quality report" includes both local link quality reports and network link quality reports.

In various embodiments, the network controller can aggregate information included in multiple local link quality reports from multiple different network elements into a combined network link quality report. The network controller can select less than all of the information in any or all of the local link quality reports and can also insert additional information into the network link quality report. In some embodiments a link quality report sent to the analytics engine can, but need not, include information related to an entire optical path or optical path segment, while in other embodiments each link quality report sent to the analytics engine includes information related to a single link.

As illustrated by block 820, the analytics engine identifies potential link impairments based on an analysis of information included in the link quality reports received from the network controller. Various embodiments can employ artificial intelligence (AI) algorithms based on a historical analysis of link states included in the link quality reports. Identification of potential link impairments includes estimating a time, or time range, during which the predicted impairment is expected to occur. Estimating the time at which a potential link impairment will occur can include analyzing current network conditions and comparing the current network conditions to prior conditions during which a link impairment occurred.

In some instances, predicting impairment of a second link can be based on a previous impairment of a first link under similar network conditions. For example, if a first link experienced an impairment 120 milliseconds (ms) after the power level of the first link increased above a first threshold, analytics engine can identify a trend in the current power level of the second link that will cause the power level of the second link to exceed the threshold in 30 seconds. Based on the trend estimation, the analytics engine can estimate that the second link will experience an impairment 30 seconds plus 120 ms.

As illustrated by block 825, in response to identifying a potential link impairment, the analytics engine notifies the network controller of the potential link impairment in a warning message. The warning message can include a waiting period set in accordance with the estimated time of link impairment determined by the analytics engine. The network controller's response to the warning message has been discussed with reference to FIG. 7.

Figure 9:
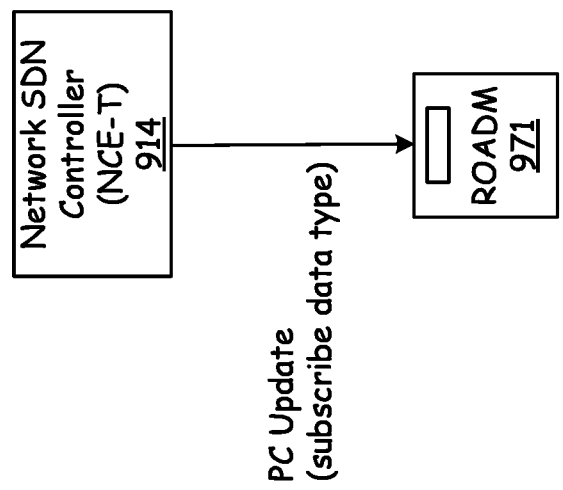
FIG. 9 is a diagram illustrating a path computation (PC) update message transmitted from a Path Computation Element (PCE) to an Path Computation Client (PCC) indicating data types to which the PCE is subscribing, according to various embodiments of the present disclosure.
Figure 9:
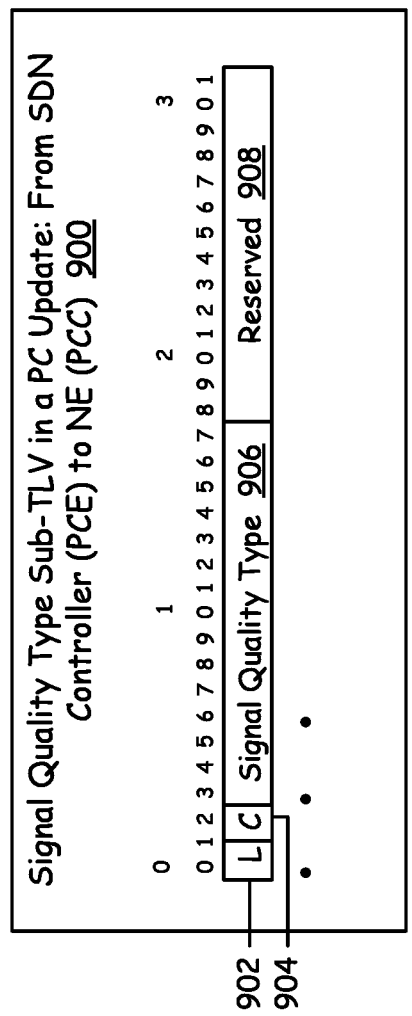

Referring next to FIG. 9, a path computation (PC) update message 900 indicating subscribed data types will be discussed according to various embodiments of the present disclosure. In various embodiments, PC update message 900 is transmitted from a Path Computation Element (PCE) to a Path Computation Client (PCC), and indicates data types to which the PCE is subscribing. In FIG. 9, network controller 914 is the PCE, and ROADM 971 is the PCC.

PC update message 900 includes link type field 902, consisting of 2 bits in this example. In the illustrated example, link type field 902 identifies a link level, where a binary value of (00) indicates an OTS link and a binary value of (11) indicates an OMS link. Binary values (10) and (11) are reserved for future use.

PC update message 900 also includes a 1-bit channel level field 904, which identifies whether link state data is optical channel (lambda) level or fiber level: C=O: fiber level; C=1: Optical channel level.

PC update message 900 also includes a 16-bit signal quality type field 906. Signal quality type field 906 identifies the type of signal quality data (i.e., impairment related data). When channel level field 904 is set to 0, a value of 1 in the signal quality type field indicates total power, a value of 2 indicates optical signal to noise ratio (OSNR), a value of 3 indicates chromatic dispersion (CD), a value of 4 indicates polarization mode dispersion (PMD), and a value of 5 indicates a max value (Reserved 908).

When channel level field 904 is set to 1, the value of signal quality type field 906 is interpreted differently than when channel level field 904 is set to 0. For example, channel level field 904 is set to 1, a value of 1 in the signal quality type field indicates channel power, a value of 2 indicates optical signal to noise ratio (OSNR), a value of 3 indicates chromatic dispersion (CD), a value of 4 indicates polarization mode dispersion (PMD), and a value of 5 indicates a bit error rate (BER), a value of 6 indicates a Q-factor, and a value of 7 indicates a max value (Reserved).

Figure 10:
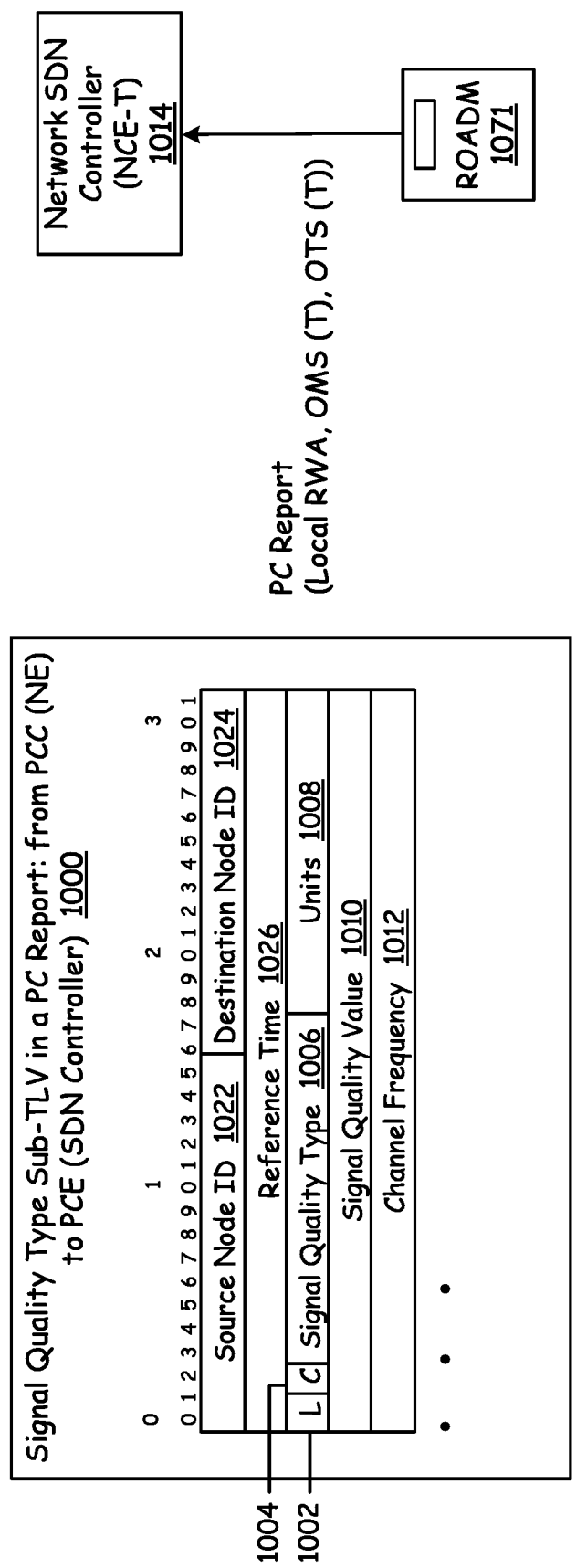
FIG. 10 is a diagram illustrating a path computation (PC) report message transmitted from a Path Computation Client (PCC) to a Path Computation Element (PCE) including signal quality information, according to various embodiments of the present disclosure.

Referring next to FIG. 10, a path computation (PC) report message 1000 reporting link state data will be discussed in accordance with various embodiments of the present disclosure. In various embodiments, PC report message 1000 is transmitted from a Path Computation Client (PCC) to a Path Computation Element (PCE) and includes signal quality information. In FIG. 10, network controller 1014 is the PCE, and ROADM 1071 is the PCC.

PC report message 1000 includes a 16-bit source node ID field 1022, which Identifies the node associated with the report. The node associated with report can be the same transmitting the report. In some embodiments, the one node can transmit a PC report message on behalf of another node, in which case the node associated with the report is the node on whose behalf the report is being transmitted. In some embodiments, the node can be ROADM, an in-line amplifier (ILA), or the like.

PC report message 1000 also includes a 16-bit destination node ID field 1024, which identifies the destination node associated with the report. A 32-bit reference time field 1026 is included to identify the TLV report's time reference, can be, but is not limited to, Greenwich Mean Time (GMT) or coordinated universal time (UTC). The term TLV refers to a stable, open shortest path first (OSPF) traffic engineering (TE) node internet protocol (IP) address, which is always reachable when there is IP connectivity to the associated OSPF TE node. The term "TLV" is sometimes used as a shorthand reference to the associated OSPF TE node (rather than the address of the node).

PC report message 1000 also includes a 2-bit link type field 1002, which identifies a link level, where a binary value of (00) indicates an OTS link and a binary value of (11) indicates an OMS link. Binary values (10) and (11) are reserved for future use.

PC report message 1000 also includes a 1-bit channel level field 1004, which identifies whether link state data is optical channel (lambda) level or fiber level: C=O: fiber level; C=l: Optical channel level. A 16-bit signal quality type field 1006 identifies the type of impairment related data, such as signal quality type. A 13-bit units field 1008 indicates the units of the value stored in signal quality value field 1010.

When the value of channel level field 1004 is 0 and the signal quality type field 1006 has a value of 1, the signal quality type is total power, and the value in units field 1008 is interpreted as decibel-milliwatts (dBm). When the value of channel level field 1004 is 0 and the signal quality type field 1006 has a value of 2, the signal quality type is OSNR, and value in units field 1008 is interpreted as decibels (db). When the value of channel level field 1004 is 0 and the signal quality type field 1006 has a value of 3, the signal quality type is CD, and value in units field 1008 is interpreted as phase shift (ps)/nanometer (nm). When the value of channel level field 1004 is 0 and the signal quality type field 1006 has a value of 4, the signal quality type is PMD and value in units field 1008 is interpreted as phase shift (ps). When the value of channel level field 1004 is 0, the signal quality type field 1006 value of 5 (max value) is reserved.

When the value of channel level field 1004 is 1 and the signal quality type field 1006 has a value of 1, the signal quality type is channel power, and the value in units field 1008 is interpreted as dBm. When the value of channel level field 1004 is 1 and the signal quality type field 1006 has a value of 2, the signal quality type is OSNR, and value in units field 1008 is interpreted as db. When the value of channel level field 1004 is 1 and the signal quality type field 1006 has a value of 3, the signal quality type is CD, and value in units field 1008 is interpreted as ps/nm. When the value of channel level field 1004 is 1 and the signal quality type field 1006 has a value of 4, the signal quality type is PMD and value in units field 1008 is interpreted as ps. When the value of channel level field 1004 is 1 and the signal quality type field 1006 has a value of 5, the signal quality type is BER and value in units field 1008 is interpreted as a rate. When the value of channel level field 1004 is 1 and the signal quality type field 1006 has a value of 6, the signal quality type is Q-factor and value in units field 1008 is interpreted as unitless. When the value of channel level field 1004 is 1, the signal quality type field 1006 value of 7 (max value) is reserved.

In the illustrated embodiment, the signal quality value field 1010 is 32 bits and indicates the value of the signal quality type. Channel frequency field 1012 is 32 bits and indicates the optical channel frequency for the signal quality type/value. Channel Frequency field 1012 is applicable when channel level field 1004 is set to 1.

Figure 11:
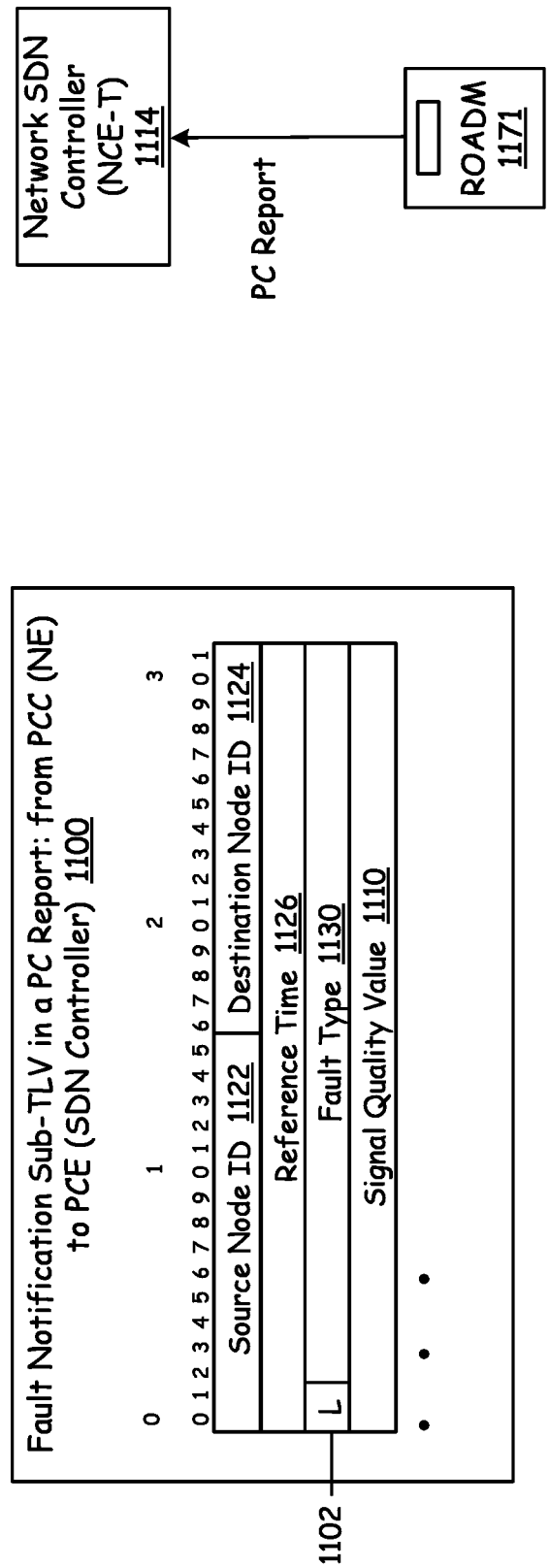
FIG. 11 is a diagram illustrating a path computation (PC) report message transmitted from a Path Computation Client (PCC) to a Path Computation Element (PCE) including a fault notification, according to various embodiments of the present disclosure.

Referring next to FIG. 11, a path computation (PC) report message 1100 providing a fault notification will be discussed in accordance with various embodiments of the present disclosure. In various embodiments, PC report message 1100 is transmitted from a Path Computation Client (PCC) to a Path Computation Element (PCE) and includes a fault notification. In FIG. 11, network controller 1114 is the PCE, and ROADM 1171 is the PCC.

Source Node ID field 1122 is 16 bits and identifies the source node associated with the fault. Destination node ID field 1124 is 16 bits and identifies the destination node associated with the fault. Reference time field 1126 is 32 bits and identifies the TLV report's time reference, which in at least one embodiment is GMT or UTC. Link type field 1102 is a 2-bit field that identifies the link level associated with the fault. In at least one embodiment, a binary value of (00) indicates an OTS link and a binary value of (01) indicates an OMS link. The binary values (10) and (11) are reserved for future use.

Fault type field 1130 is 30 bits and identifies the type of fault. For example, a value of 1 can be used to indicate a power failure, and a value of 2 can be used to indicate an OSNR failure. In at least one embodiment, the maximum value of 3 is reserved. Signal quality value field 1110 is 32 bits and indicates a signal quality value associated with the fault type.

Figure 12:
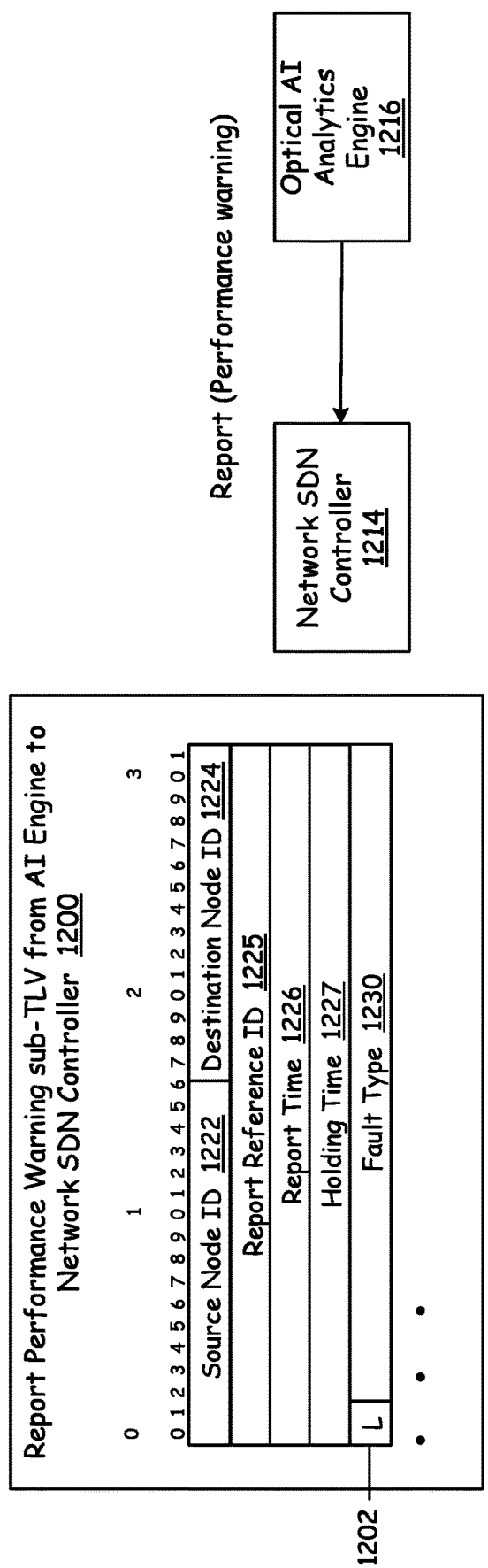
FIG. 12 is a diagram illustrating a Performance Warning message transmitted from an Analytics Engine to a Network Controller, according to various embodiments of the present disclosure.

Referring next to FIG. 12, a performance warning message 1200 will be discussed in accordance with various embodiments of the present disclosure. In various embodiments, performance warning message 1200 is transmitted from an analytics engine 1216 to a network controller 1214.

Source Node ID field 1222 is 16 bits and identifies the source node associated with the performance degradation, or impairment, warning. Destination node ID field 1224 is 16 bits and identifies the destination node associated with the performance degradation, or impairment, warning. Report reference ID field 1225 is a 32-bit field that identifies an instance of a warning to allow for tracking, and provides a value that can be used to match performance report messages to warning messages. Report time field 1226 is 32 bits and includes a reference time of the report is being made. Holding Time field 1227 is 32 bits and indicates a wait time duration during which the activation of a rerouting is to be put on hold. Link type field 1202 is a 2-bitfield that identifies the link level associated with the fault. In at least one embodiment, a binary value of (00) indicates an OTS link and a binary value of (01) indicates an OMS link. The binary values (10) and (11) are reserved for future use. Fault type field 1230 identifies the type of fault the warning is indicating. In at least one embodiment, a value of 1 indicates a power failure, and a value of 2 indicates an OSNR failure. The value 3 (max value) is reserved for future use.

Figure 13:
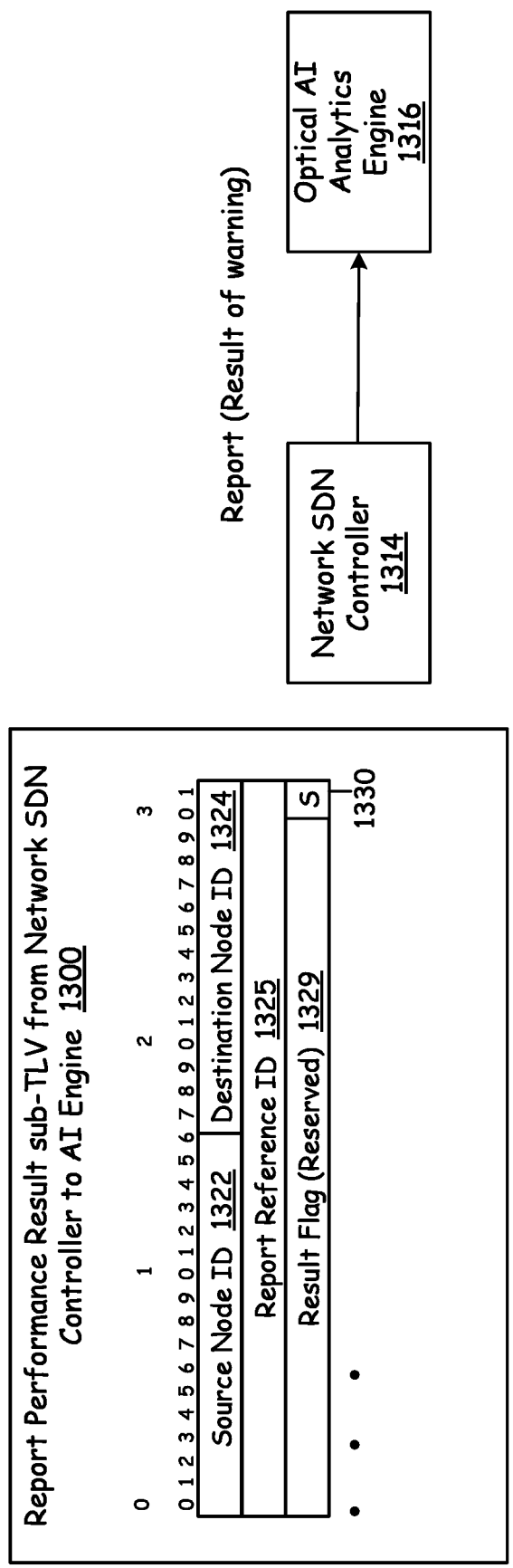
FIG. 13 is a diagram illustrating a Performance Report message, transmitted from a Network Controller to an Analytics Engine, reporting actions taken in response to a Performance Warning message, according to various embodiments of the present disclosure.

Referring next to FIG. 13, a performance report message 1300 will be discussed in accordance with various embodiments of the present disclosure. In various embodiments, performance warning message 1300 is transmitted from network controller 1314 to analytics engine 1316 and is used to report actions taken in response to a performance warning message.

Source Node ID field 1322 is 16 bits and identifies the source node associated with the performance degradation, or impairment, warning. Destination node ID field 1324 is 16 bits and identifies the destination node associated with the performance degradation, or impairment, warning. Report reference ID field 1325 is a 32-bitfield that identifies the report reference included in a corresponding warning message, to allow the performance report message to be linked to the appropriate warning message. Result Flag filed 1329 is reserved and success bit 1330 indicates whether the performance warning worked or not.

Figure 14:
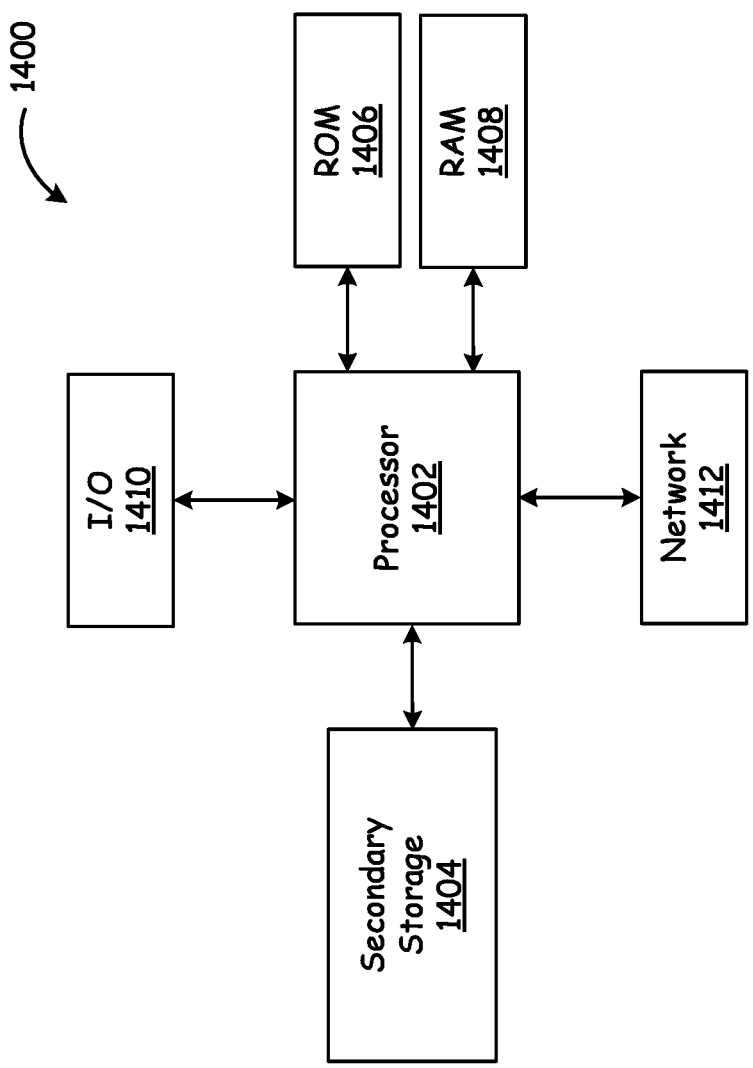
FIG. 14 is a schematic diagram of one embodiment of a general-purpose computer system.

Referring next to FIG. 14, a processing architecture 1400 will be discussed in accordance with various embodiments. Processing architecture 1400 includes components suitable for use in conjunction with, or for integration into, various devices described above. Processing architecture 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor may be implemented as one or more CPU chips or may be part of one or more application specific integrated circuits (ASICs).

Secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. ROM 1406 is used to store instructions, and perhaps data, that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

As may be used herein, the terms "substantially" and "approximately" provide an industry-accepted tolerance for their corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" include direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternative boundaries and sequences can be defined so long as the specified functions and relationships are appropriately performed. Any such alternative boundaries or sequences are thus within the scope and spirit of the claims. Further, the boundaries of these functional building blocks have been arbitrarily defined for convenience of description. Alternative boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternative definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A network controller comprising:
a processor and associated memory;
a network interface coupled to the processor and associated memory, the network interface configured to receive a warning message from a network analytics engine, the warning message indicating a predicted impairment of one or more suspect communication links included in a current data path used to transmit data through a network;
the processor and associated memory configured to:
identify, in response to the warning message, one or more potential alternative data paths to be used to transmit the data through the network, the one or more potential alternative data paths excluding the one or more suspect communication links;

determine whether a fault notification is received from a device associated with the one or more suspect communication links before expiration of a waiting period, the fault notification confirming the predicted impairment of the one or more suspect communications link; and in response to receiving the fault notification before expiration of the waiting period, set up a particular data path to be used to transmit the data through the network in place of the current data path by transmitting routing information to one or more nodes included in the particular data path, wherein the routing information includes information indicating particular communication links to be used by the one or more nodes, and wherein the particular data path is selected from among the one or more potential alternative data paths.

2. The network controller of claim 1, wherein the warning message includes information specifying the waiting period.

3. The network controller of claim 2, wherein the processor and associated memory are further configured to leave the current data path unchanged in response to determining that the fault notification is not received before expiration of the waiting period.

4. The network controller of claim 1, wherein the processor and associated memory are further configured to set up the current data path by:
determining first nodes included in one or more potential current data paths, the first nodes coupled to each other via first communications links;
requesting an impairment validation from the network analytics engine, the impairment validation indicating whether the first communication links are expected to remain impairment free;
receiving the impairment validation from the analytics engine;
selecting the current data path from among the one or more potential current data paths based on the impairment validation; and
transmitting routing information to at least a subset of the first nodes included in the current data path, the routing information including information indicating current first communication links to be used.

5. The network controller of claim 1, wherein the processor and associated memory are further configured to report, to the network analytics engine, information indicating an action taken by the network controller in response to the warning message.

6. The network controller of claim 1, wherein the network includes at least one of a Wavelength Switched Optical Network (WSON) or a Spectrum Switched Optical Network (SSON); and wherein the processor and associated memory are further configured to set up the particular data path by transmitting control signals to at least one of a Reconfigurable Optical Add Drop Multiplexer (ROADM) associated with an Optical Multiplexing Section (OMS) link, or an optical In-Line Amplifier (ILA) associated with an Optical Transmission Section (OTS) link.

7. The network controller of claim 1, wherein the processor and associated memory are further configured to:
transmit a path computation (PC) update from the network controller to one or more network nodes, the PC update including information specifying one or more data types to which the network controller is subscribing.

8. The network controller of claim 7, wherein the processor and associated memory are further configured to receive signal quality reports from the one or more network nodes, the signal quality reports including data types to which the network controller subscribed.

9. The network controller of claim 8, wherein the processor and associated memory are further configured to forward information included in the signal quality reports to the analytics engine.

10. A method for use in a network controller, the method comprising:
receiving, at the network controller, a warning message from a network analytics engine, the warning message indicating predicted impairment of one or more suspect communication links included in a current data path used to transmit data through a network;
identifying, in response to the warning message, one or more potential alternative data paths to be used to transmit the data through the network, the one or more potential alternative data paths excluding the one or more suspect communication links;
determining whether a fault notification is received from a device associated with the one or more suspect communication links before expiration of a waiting period, the fault notification confirming the predicted impairment of the one or more suspect communications link; and
in response to receiving the fault notification before expiration of the waiting period, setting up a particular data path to be used to transmit the data through the network in place of the current data path by transmitting routing information to one or more nodes included in the particular data path, wherein the routing information includes information indicating particular communication links to be used by the one or more nodes, and wherein the particular data path is selected from among the one or more potential alternative data paths.

11. The method of claim 10, wherein the warning message includes information specifying the waiting period.

12. The method of claim 11, further including leaving the current data path unchanged in response to determining that the fault notification is not received before expiration of the waiting period.

13. The method of claim 10, wherein setting up the current data path includes:
determining first nodes included in one or more potential current data paths, the first nodes coupled to each other via first communications links requesting an impairment validation from the network analytics engine, the impairment validation indicating whether the first communication links are expected to remain impairment free;
receiving the impairment validation from the analytics engine;
selecting the current data path from among the one or more potential current data paths based on the impairment validation; and
transmitting routing information to a subset of the first nodes included in the current data path, the routing information including information indicating current first communication links to be used by the subset of the first nodes.

14. The method of claim 10, further including reporting, to the network analytics engine, information indicating an action taken by the network controller in response to the warning message.

15. The method of claim 10, wherein the network includes at least one of a Wavelength Switched Optical Network (WSON) or a Spectrum Switched Optical Network (SSON); and wherein setting up the particular data path includes transmitting control signals to at least one of a Reconfigurable Optical Add Drop Multiplexer (ROADM) associated with an Optical Multiplexing Section (OMS) link, or an optical In Line Amplifier (ILA) associated with an Optical Transmission Section (OTS) link.

16. An optical communications network, comprising:
reconfigurable optical add drop multiplexers (ROADMs) coupled to each other via optical communication links;
a Software Defined Networking (SDN) controller coupled to the ROADMS via other communication links, configured to establish data paths through the optical communications network by controlling network routing and wavelength assignments (RWAs) for the ROADMs; and
the SDN controller further configured to:
receive a warning message from an optical network analytics engine, the warning message including information identifying predicted impairment of one or more of the optical communications links included in a current data path;
identify, in response to the warning message, one or more potential alternative data paths to be used to transmit the data through the network, the one or more potential alternative data paths excluding the one or more suspect communication links;
determine whether a fault notification is received from a device associated with the one or more suspect communication links before expiration of a waiting period, the fault notification confirming the predicted impairment of the one or more suspect communications link; and
in response to receiving the fault notification before expiration of the waiting period, set up a particular data path to be used to transmit the data through the network in place of the current data path by transmitting routing information to one or more ROADMs, wherein the routing information includes information indicating particular communication links to be used by the one or more ROADMs, and wherein the particular data path is selected from among the one or more potential alternative data paths.

17. The optical communications network of claim 16, wherein the warning message includes information specifying the waiting period.

* * * * *